United States Patent
Reed

(10) Patent No.: US 12,439,488 B2
(45) Date of Patent: Oct. 7, 2025

(54) FIELD ADJUSTABLE OUTPUT FOR DIMMABLE LUMINAIRES

(71) Applicant: EXPRESS IMAGING SYSTEMS, LLC, Renton, WA (US)

(72) Inventor: William G. Reed, Seattle, WA (US)

(73) Assignee: EXPRESS IMAGING SYSTEMS, LLC, Renton, WA (US)

( * ) Notice: Subject to any disclaimer, the term of this patent is extended or adjusted under 35 U.S.C. 154(b) by 122 days.

(21) Appl. No.: 18/533,740

(22) Filed: Dec. 8, 2023

(65) Prior Publication Data

US 2024/0196490 A1   Jun. 13, 2024

Related U.S. Application Data

(60) Provisional application No. 63/431,466, filed on Dec. 9, 2022.

(51) Int. Cl.
*H05B 45/10* (2020.01)
*F21V 23/00* (2015.01)
(Continued)

(52) U.S. Cl.
CPC ........... *H05B 45/10* (2020.01); *F21V 23/008* (2013.01); *F21V 23/04* (2013.01);
(Continued)

(58) Field of Classification Search
CPC ....... H05B 45/10; F21V 23/008; F21V 23/04; F21V 23/0442; F21V 23/06; F21Y 2115/10
See application file for complete search history.

(56) References Cited

U.S. PATENT DOCUMENTS

| | | |
|---|---|---|
| 2,240,050 A | 4/1941 | John |
| 2,745,055 A | 5/1956 | Woerdemann |

(Continued)

FOREIGN PATENT DOCUMENTS

| | | |
|---|---|---|
| CN | 103162187 A | 6/2013 |
| DE | 4001980 A1 | 8/1990 |

(Continued)

OTHER PUBLICATIONS

"Lcd Backlight I/O Ports and Power Protection Circuit Design," dated May 2, 2011, retrieved Jun. 10, 2011, from http://www.chipoy.info/gadgets/LCD-backlight-i-o-ports-and-power-pr . . . , 4 pages.

(Continued)

*Primary Examiner* — Minh Tran
(74) *Attorney, Agent, or Firm* — Cozen O'Connor

(57) ABSTRACT

A field adjustable output control usable with a luminaire to adjust dimming employs a first resistance source, and at least a second resistance source, and a shunt voltage regulator having a reference node coupled between the first and the second resistance sources to form a voltage divider that provides a reference voltage to the shunt voltage regulator, wherein the shunt voltage regulator is electrically coupled between an LED driver dimming line and a ground via first and second nodes of the shunt voltage regulator to regulate a flow of current from the LED driver dimming line based on the reference voltage supplied via the voltage divider. The second resistance source can take the form of a plurality of discrete resistors, each having a respective value of resistance, or alternatively can take the form of a potentiometer having a continuously variable value of resistance associated therewith.

22 Claims, 7 Drawing Sheets

(51) Int. Cl.
*F21V 23/04* (2006.01)
*F21V 23/06* (2006.01)
*F21Y 115/10* (2016.01)

(52) U.S. Cl.
CPC .......... *F21V 23/0442* (2013.01); *F21V 23/06* (2013.01); *F21Y 2115/10* (2016.08)

(56) References Cited

U.S. PATENT DOCUMENTS

| | | |
|---|---|---|
| 3,374,396 A | 3/1968 | Bell et al. |
| 4,153,927 A | 5/1979 | Owens |
| 4,237,377 A | 12/1980 | Sansum |
| 4,663,521 A | 5/1987 | Maile |
| 5,086,379 A | 2/1992 | Denison et al. |
| 5,160,202 A | 11/1992 | Legare |
| 5,161,107 A | 11/1992 | Mayeaux et al. |
| 5,230,556 A | 7/1993 | Canty et al. |
| 5,276,385 A | 1/1994 | Itoh et al. |
| 5,343,121 A | 8/1994 | Terman et al. |
| 5,349,505 A | 9/1994 | Poppenheimer |
| 5,450,302 A | 9/1995 | Maase et al. |
| 5,508,589 A | 4/1996 | Archdekin |
| 5,561,351 A | 10/1996 | Vrionis et al. |
| 5,589,741 A | 12/1996 | Terman et al. |
| 5,619,127 A | 4/1997 | Warizaya |
| 5,808,294 A | 9/1998 | Neumann |
| 5,838,226 A | 11/1998 | Houggy et al. |
| 5,869,960 A | 2/1999 | Brand |
| 5,892,331 A | 4/1999 | Hollaway |
| 5,892,335 A | 4/1999 | Archer |
| 5,936,362 A | 8/1999 | Alt et al. |
| 5,995,350 A | 11/1999 | Kopelman |
| 6,111,739 A | 8/2000 | Wu et al. |
| 6,149,283 A | 11/2000 | Conway et al. |
| 6,154,015 A | 11/2000 | Ichiba |
| 6,160,353 A | 12/2000 | Mancuso |
| 6,198,233 B1 | 3/2001 | Mcconaughy |
| 6,211,627 B1 | 4/2001 | Callahan |
| 6,377,191 B1 | 4/2002 | Takubo |
| 6,612,720 B1 | 9/2003 | Beadle |
| 6,674,060 B2 | 1/2004 | Antila |
| 6,681,195 B1 | 1/2004 | Poland et al. |
| 6,746,274 B1 | 6/2004 | Verfuerth |
| 6,753,842 B1 | 6/2004 | Williams et al. |
| 6,828,911 B2 | 12/2004 | Jones et al. |
| 6,841,947 B2 | 1/2005 | Berg-Johansen |
| 6,880,956 B2 | 4/2005 | Zhang |
| 6,902,292 B2 | 6/2005 | Lai |
| 6,985,827 B2 | 1/2006 | Williams et al. |
| 7,019,276 B2 | 3/2006 | Cloutier et al. |
| 7,066,622 B2 | 6/2006 | Alessio |
| 7,081,722 B1 | 7/2006 | Huynh et al. |
| 7,084,587 B2 | 8/2006 | Archdekin et al. |
| 7,122,976 B1 | 10/2006 | Smith et al. |
| 7,188,967 B2 | 3/2007 | Dalton et al. |
| 7,190,121 B2 | 3/2007 | Rose et al. |
| 7,196,477 B2 | 3/2007 | Richmond |
| 7,218,056 B1 | 5/2007 | Harwood |
| 7,239,087 B2 | 7/2007 | Ball |
| 7,252,385 B2 | 8/2007 | Engle et al. |
| 7,258,464 B2 | 8/2007 | Morris et al. |
| 7,270,441 B2 | 9/2007 | Fiene |
| 7,281,820 B2 | 10/2007 | Bayat et al. |
| 7,294,973 B2 | 11/2007 | Takahama et al. |
| 7,314,291 B2 | 1/2008 | Tain et al. |
| 7,317,403 B2 | 1/2008 | Grootes et al. |
| 7,322,714 B2 | 1/2008 | Barnett et al. |
| 7,330,568 B2 | 2/2008 | Nagaoka et al. |
| 7,339,323 B2 | 3/2008 | Bucur |
| 7,339,471 B1 | 3/2008 | Chan et al. |
| 7,405,524 B2 | 7/2008 | Smith et al. |
| 7,438,440 B2 | 10/2008 | Dorogi |
| 7,440,280 B2 | 10/2008 | Shuy |
| 7,468,723 B1 | 12/2008 | Collins |
| 7,524,089 B2 | 4/2009 | Park |
| 7,538,499 B2 | 5/2009 | Ashdown |
| 7,547,113 B2 | 6/2009 | Lee |
| 7,559,674 B2 | 7/2009 | He et al. |
| 7,564,198 B2 | 7/2009 | Yamamoto et al. |
| 7,569,802 B1 | 8/2009 | Mullins |
| 7,578,596 B2 | 8/2009 | Martin |
| 7,578,597 B2 | 8/2009 | Hoover et al. |
| 7,623,042 B2 | 11/2009 | Huizenga |
| 7,627,372 B2 | 12/2009 | Vaisnys et al. |
| 7,631,324 B2 | 12/2009 | Buonasera et al. |
| 7,633,463 B2 | 12/2009 | Negru |
| 7,638,743 B2 | 12/2009 | Bartol et al. |
| 7,665,862 B2 | 2/2010 | Villard |
| 7,677,753 B1 | 3/2010 | Wills |
| 7,688,002 B2 | 3/2010 | Ashdown et al. |
| 7,688,222 B2 | 3/2010 | Peddie et al. |
| 7,697,925 B1 | 4/2010 | Wilson et al. |
| 7,702,135 B2 | 4/2010 | Hill et al. |
| 7,703,951 B2 | 4/2010 | Piepgras et al. |
| 7,746,003 B2 | 6/2010 | Verfuerth et al. |
| D621,410 S | 8/2010 | Verfuerth et al. |
| D621,411 S | 8/2010 | Verfuerth et al. |
| 7,798,669 B2 | 9/2010 | Trojanowski et al. |
| 7,804,200 B2 | 9/2010 | Flaherty |
| 7,828,463 B1 | 11/2010 | Willis |
| 7,834,922 B2 | 11/2010 | Kurane |
| 7,872,423 B2 | 1/2011 | Biery et al. |
| 7,932,535 B2 | 4/2011 | Mahalingam et al. |
| 7,940,191 B2 | 5/2011 | Hierzer |
| 7,952,609 B2 | 5/2011 | Simerly et al. |
| 7,960,919 B2 | 6/2011 | Furukawa |
| 7,983,817 B2 | 7/2011 | Breed |
| 7,985,005 B2 | 7/2011 | Alexander et al. |
| 8,100,552 B2 | 1/2012 | Spero |
| 8,118,456 B2 | 2/2012 | Reed et al. |
| 8,143,769 B2 | 3/2012 | Li |
| 8,174,212 B2 | 5/2012 | Tziony et al. |
| 8,183,797 B2 | 5/2012 | Mckinney |
| 8,207,830 B2 | 6/2012 | Rutjes et al. |
| 8,260,575 B2 | 9/2012 | Walters et al. |
| 8,290,710 B2 | 10/2012 | Cleland et al. |
| 8,324,840 B2 | 12/2012 | Shteynberg et al. |
| 8,334,640 B2 | 12/2012 | Reed et al. |
| 8,344,665 B2 | 1/2013 | Verfuerth et al. |
| 8,376,583 B2 | 2/2013 | Wang et al. |
| 8,378,563 B2 | 2/2013 | Reed et al. |
| 8,390,475 B2 | 3/2013 | Feroldi |
| 8,395,329 B2 | 3/2013 | Jutras et al. |
| 8,427,076 B2 | 4/2013 | Bourquin et al. |
| 8,436,556 B2 | 5/2013 | Eisele et al. |
| 8,445,826 B2 | 5/2013 | Verfuerth |
| 8,450,670 B2 | 5/2013 | Verfuerth et al. |
| 8,457,793 B2 | 6/2013 | Golding et al. |
| 8,476,565 B2 | 7/2013 | Verfuerth |
| 8,508,137 B2 | 8/2013 | Reed |
| 8,541,950 B2 | 9/2013 | Reed |
| 8,547,022 B2 | 10/2013 | Summerford et al. |
| 8,586,902 B2 | 11/2013 | Verfuerth |
| 8,604,701 B2 | 12/2013 | Verfuerth et al. |
| 8,610,358 B2 | 12/2013 | Reed |
| 8,629,621 B2 | 1/2014 | Reed |
| 8,674,608 B2 | 3/2014 | Holland et al. |
| 8,749,403 B2 | 6/2014 | King et al. |
| 8,749,635 B2 | 6/2014 | Hogasten et al. |
| 8,764,237 B2 | 7/2014 | Wang et al. |
| 8,779,340 B2 | 7/2014 | Verfuerth et al. |
| 8,779,686 B2 | 7/2014 | Jin |
| 8,810,138 B2 | 8/2014 | Reed |
| 8,866,392 B2 | 10/2014 | Chen |
| 8,866,582 B2 | 10/2014 | Verfuerth et al. |
| 8,872,430 B2 | 10/2014 | Yang |
| 8,872,964 B2 | 10/2014 | Reed et al. |
| 8,878,440 B2 | 11/2014 | Reed |
| 8,884,203 B2 | 11/2014 | Verfuerth et al. |
| 8,896,215 B2 | 11/2014 | Reed et al. |
| 8,901,825 B2 | 12/2014 | Reed |
| 8,921,751 B2 | 12/2014 | Verfuerth |
| 8,922,124 B2 | 12/2014 | Reed et al. |
| 8,926,138 B2 | 1/2015 | Reed et al. |

(56) References Cited

U.S. PATENT DOCUMENTS

| | | |
|---|---|---|
| 8,926,139 B2 | 1/2015 | Reed et al. |
| 8,975,827 B2 | 3/2015 | Chobot et al. |
| 8,987,992 B2 | 3/2015 | Reed |
| 8,988,005 B2 | 3/2015 | Jungwirth et al. |
| 9,002,522 B2 | 4/2015 | Mohan et al. |
| 9,024,545 B2 | 5/2015 | Bloch et al. |
| 9,084,310 B2 | 7/2015 | Bedell et al. |
| 9,107,026 B1 | 8/2015 | Viswanadham et al. |
| 9,119,270 B2 | 8/2015 | Chen et al. |
| 9,125,261 B2 | 9/2015 | Reed |
| 9,131,552 B2 | 9/2015 | Reed et al. |
| 9,185,777 B2 | 11/2015 | Reed |
| 9,204,523 B2 | 12/2015 | Reed et al. |
| 9,210,751 B2 | 12/2015 | Reed |
| 9,210,759 B2 | 12/2015 | Reed |
| 9,288,873 B2 | 3/2016 | Reed |
| 9,301,365 B2 | 3/2016 | Reed |
| 9,312,451 B2 | 4/2016 | Reed et al. |
| 9,357,618 B2 | 5/2016 | Pandharipande et al. |
| 9,360,198 B2 | 6/2016 | Reed |
| 9,414,449 B2 | 8/2016 | Reed |
| 9,433,062 B2 | 8/2016 | Reed |
| 9,445,485 B2 | 9/2016 | Reed |
| 9,450,347 B2 | 9/2016 | Kondou et al. |
| 9,462,662 B1 | 10/2016 | Reed |
| 9,466,443 B2 | 10/2016 | Reed |
| 9,497,393 B2 | 11/2016 | Reed et al. |
| 9,538,612 B1 | 1/2017 | Reed |
| 9,572,230 B2 | 2/2017 | Reed |
| 9,693,433 B2 | 6/2017 | Reed et al. |
| 9,713,228 B2 | 7/2017 | Reed |
| 9,781,797 B2 | 10/2017 | Reed |
| 9,801,248 B2 | 10/2017 | Reed et al. |
| 9,924,582 B2 | 3/2018 | Vendetti et al. |
| 9,930,758 B2 | 3/2018 | Jayawardena et al. |
| 9,967,933 B2 | 5/2018 | Reed |
| 9,985,429 B2 | 5/2018 | Reed |
| 10,009,983 B2 | 6/2018 | Noesner |
| 10,068,468 B2 | 9/2018 | John et al. |
| 10,098,212 B2 | 10/2018 | Vendetti et al. |
| 10,219,360 B2 | 2/2019 | Vendetti et al. |
| 10,230,296 B2 | 3/2019 | Reed |
| 10,390,414 B2 | 8/2019 | Vendetti et al. |
| 10,433,382 B2 | 10/2019 | Kottritsch et al. |
| 10,531,537 B2 | 1/2020 | Reed |
| 11,234,304 B2 | 1/2022 | Reed |
| 11,317,497 B2 | 4/2022 | Reed et al. |
| 2002/0084767 A1 | 7/2002 | Arai |
| 2002/0113192 A1 | 8/2002 | Antila |
| 2003/0016143 A1 | 1/2003 | Ghazarian |
| 2003/0184672 A1 | 10/2003 | Wu et al. |
| 2004/0095772 A1 | 5/2004 | Hoover et al. |
| 2004/0105264 A1 | 6/2004 | Spero |
| 2004/0120148 A1 | 6/2004 | Morris et al. |
| 2004/0192227 A1 | 9/2004 | Beach et al. |
| 2004/0201992 A1 | 10/2004 | Dalton et al. |
| 2005/0099802 A1 | 5/2005 | Lai |
| 2005/0117344 A1 | 6/2005 | Bucher et al. |
| 2005/0135101 A1 | 6/2005 | Richmond |
| 2005/0174762 A1 | 8/2005 | Fogerlie |
| 2005/0174780 A1 | 8/2005 | Park |
| 2005/0179404 A1 | 8/2005 | Veskovic et al. |
| 2005/0231133 A1 | 10/2005 | Lys |
| 2005/0243022 A1 | 11/2005 | Negru |
| 2005/0254013 A1 | 11/2005 | Engle et al. |
| 2006/0001384 A1 | 1/2006 | Tain et al. |
| 2006/0014118 A1 | 1/2006 | Utama |
| 2006/0034075 A1 | 2/2006 | Alessio |
| 2006/0053459 A1 | 3/2006 | Simerly et al. |
| 2006/0066264 A1 | 3/2006 | Ishigaki et al. |
| 2006/0098440 A1 | 5/2006 | Allen |
| 2006/0114118 A1 | 6/2006 | Toulmin et al. |
| 2006/0133079 A1 | 6/2006 | Callahan |
| 2006/0146652 A1 | 7/2006 | Huizi et al. |
| 2006/0158130 A1 | 7/2006 | Furukawa |
| 2006/0202914 A1 | 9/2006 | Ashdown |
| 2006/0208667 A1 | 9/2006 | Lys et al. |
| 2006/0259080 A1 | 11/2006 | Vaisnys et al. |
| 2006/0262544 A1 | 11/2006 | Piepgras et al. |
| 2006/0277823 A1 | 12/2006 | Barnett et al. |
| 2007/0032990 A1 | 2/2007 | Williams et al. |
| 2007/0096118 A1 | 5/2007 | Mahalingam et al. |
| 2007/0102033 A1 | 5/2007 | Petrocy |
| 2007/0159819 A1 | 7/2007 | Bayat et al. |
| 2007/0164689 A1 | 7/2007 | Suzuki |
| 2007/0217093 A1 | 9/2007 | Xue et al. |
| 2007/0224461 A1 | 9/2007 | Oh |
| 2007/0225933 A1 | 9/2007 | Shimomura |
| 2007/0247853 A1 | 10/2007 | Dorogi |
| 2007/0279921 A1 | 12/2007 | Alexander et al. |
| 2008/0018261 A1 | 1/2008 | Kastner |
| 2008/0025020 A1 | 1/2008 | Kolb |
| 2008/0043106 A1 | 2/2008 | Hassapis et al. |
| 2008/0062687 A1 | 3/2008 | Behar et al. |
| 2008/0130304 A1 | 6/2008 | Rash et al. |
| 2008/0215279 A1 | 9/2008 | Salsbury et al. |
| 2008/0224623 A1 | 9/2008 | Yu |
| 2008/0232116 A1 | 9/2008 | Kim |
| 2008/0248837 A1 | 10/2008 | Kunkel |
| 2008/0266839 A1 | 10/2008 | Claypool et al. |
| 2008/0271065 A1 | 10/2008 | Buonasera et al. |
| 2008/0291661 A1 | 11/2008 | Martin |
| 2009/0046151 A1 | 2/2009 | Nagaoka et al. |
| 2009/0058320 A1 | 3/2009 | Chou et al. |
| 2009/0129067 A1 | 5/2009 | Fan et al. |
| 2009/0153062 A1 | 6/2009 | Guo et al. |
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195162 A1 | 8/2009 | Maurer et al. |
| 2009/0195179 A1 | 8/2009 | Joseph et al. |
| 2009/0230883 A1 | 9/2009 | Haug |
| 2009/0235208 A1 | 9/2009 | Nakayama et al. |
| 2009/0261735 A1 | 10/2009 | Sibalich et al. |
| 2009/0268023 A1 | 10/2009 | Hsieh |
| 2009/0273290 A1 | 11/2009 | Ziegenfuss |
| 2009/0278474 A1 | 11/2009 | Reed et al. |
| 2009/0278479 A1 | 11/2009 | Platner et al. |
| 2009/0284155 A1 | 11/2009 | Reed et al. |
| 2009/0309500 A1 | 12/2009 | Reisch |
| 2009/0315485 A1 | 12/2009 | Verfuerth et al. |
| 2010/0001652 A1 | 1/2010 | Damsleth |
| 2010/0052557 A1 | 3/2010 | Van et al. |
| 2010/0060130 A1 | 3/2010 | Li |
| 2010/0090577 A1 | 4/2010 | Reed et al. |
| 2010/0096460 A1 | 4/2010 | Carlson et al. |
| 2010/0123403 A1 | 5/2010 | Reed |
| 2010/0148677 A1 | 6/2010 | Melanson |
| 2010/0164406 A1 | 7/2010 | Kost et al. |
| 2010/0171442 A1 | 7/2010 | Draper et al. |
| 2010/0237711 A1 | 9/2010 | Parsons |
| 2010/0244708 A1 | 9/2010 | Cheung et al. |
| 2010/0246168 A1 | 9/2010 | Verfuerth et al. |
| 2010/0259193 A1 | 10/2010 | Umezawa et al. |
| 2010/0262296 A1 | 10/2010 | Davis et al. |
| 2010/0270945 A1 | 10/2010 | Chang et al. |
| 2010/0271802 A1 | 10/2010 | Recker et al. |
| 2010/0277082 A1 | 11/2010 | Reed et al. |
| 2010/0295454 A1 | 11/2010 | Reed |
| 2010/0295455 A1 | 11/2010 | Reed |
| 2010/0295946 A1 | 11/2010 | Reed et al. |
| 2010/0309310 A1 | 12/2010 | Albright |
| 2010/0328946 A1 | 12/2010 | Borkar et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0175518 A1 | 7/2011 | Reed et al. |
| 2011/0204845 A1 | 8/2011 | Paparo et al. |
| 2011/0215724 A1 | 9/2011 | Chakravarty et al. |
| 2011/0215731 A1 | 9/2011 | Jeong et al. |
| 2011/0221346 A1 | 9/2011 | Lee et al. |
| 2011/0222195 A1 | 9/2011 | Benoit et al. |
| 2011/0248812 A1 | 10/2011 | Hu et al. |
| 2011/0251751 A1 | 10/2011 | Knight |

(56) References Cited

U.S. PATENT DOCUMENTS

| | | |
|---|---|---|
| 2011/0282468 A1 | 11/2011 | Ashdown |
| 2011/0310605 A1 | 12/2011 | Renn et al. |
| 2012/0001566 A1 | 1/2012 | Josefowicz et al. |
| 2012/0001997 A1 | 1/2012 | Takada |
| 2012/0019971 A1 | 1/2012 | Flaherty et al. |
| 2012/0038490 A1 | 2/2012 | Verfuerth |
| 2012/0043893 A1* | 2/2012 | Sadwick ............ H05B 45/3725 315/127 |
| 2012/0098439 A1 | 4/2012 | Recker et al. |
| 2012/0119669 A1 | 5/2012 | Melanson et al. |
| 2012/0119682 A1 | 5/2012 | Warton |
| 2012/0139426 A1 | 6/2012 | Ilyes et al. |
| 2012/0143383 A1 | 6/2012 | Cooperrider et al. |
| 2012/0146518 A1 | 6/2012 | Keating et al. |
| 2012/0153854 A1 | 6/2012 | Setomoto et al. |
| 2012/0169053 A1 | 7/2012 | Tchoryk et al. |
| 2012/0169239 A1 | 7/2012 | Chen et al. |
| 2012/0181935 A1 | 7/2012 | Velazquez |
| 2012/0194054 A1 | 8/2012 | Johnston et al. |
| 2012/0206050 A1 | 8/2012 | Spero |
| 2012/0209755 A1 | 8/2012 | Verfuerth et al. |
| 2012/0221154 A1 | 8/2012 | Runge |
| 2012/0224363 A1 | 9/2012 | Van |
| 2012/0230584 A1 | 9/2012 | Kubo et al. |
| 2012/0242254 A1 | 9/2012 | Kim et al. |
| 2012/0262069 A1 | 10/2012 | Reed |
| 2012/0286770 A1 | 11/2012 | Schroder et al. |
| 2012/0299492 A1 | 11/2012 | Egawa et al. |
| 2013/0033183 A1 | 2/2013 | Verfuerth et al. |
| 2013/0043792 A1 | 2/2013 | Reed |
| 2013/0049613 A1 | 2/2013 | Reed |
| 2013/0057158 A1 | 3/2013 | Josefowicz et al. |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0141010 A1 | 6/2013 | Reed et al. |
| 2013/0154488 A1 | 6/2013 | Sadwick et al. |
| 2013/0163243 A1 | 6/2013 | Reed |
| 2013/0193857 A1 | 8/2013 | Tlachac et al. |
| 2013/0193879 A1* | 8/2013 | Sadwick ............ H05B 45/385 315/307 |
| 2013/0210252 A1 | 8/2013 | Ilyes |
| 2013/0229518 A1 | 9/2013 | Reed et al. |
| 2013/0235202 A1 | 9/2013 | Nagaoka et al. |
| 2013/0249429 A1 | 9/2013 | Woytowitz et al. |
| 2013/0249479 A1 | 9/2013 | Partovi |
| 2013/0293112 A1 | 11/2013 | Reed et al. |
| 2013/0293139 A1* | 11/2013 | Sadwick ............ H05B 45/37 315/224 |
| 2013/0307418 A1 | 11/2013 | Reed |
| 2013/0313982 A1 | 11/2013 | Reed |
| 2013/0320862 A1 | 12/2013 | Campbell et al. |
| 2013/0340353 A1 | 12/2013 | Whiting et al. |
| 2014/0001961 A1 | 1/2014 | Anderson et al. |
| 2014/0028198 A1 | 1/2014 | Reed et al. |
| 2014/0028200 A1 | 1/2014 | Van Wagoner et al. |
| 2014/0055990 A1 | 2/2014 | Reed |
| 2014/0070964 A1 | 3/2014 | Rupprath et al. |
| 2014/0078308 A1 | 3/2014 | Verfuerth |
| 2014/0097759 A1 | 4/2014 | Verfuerth et al. |
| 2014/0128941 A1 | 5/2014 | Williams |
| 2014/0139116 A1 | 5/2014 | Reed |
| 2014/0159585 A1 | 6/2014 | Reed |
| 2014/0166447 A1 | 6/2014 | Thea et al. |
| 2014/0203714 A1 | 7/2014 | Zhang et al. |
| 2014/0225521 A1 | 8/2014 | Reed |
| 2014/0244044 A1 | 8/2014 | Davis et al. |
| 2014/0252961 A1 | 9/2014 | Ramer et al. |
| 2014/0265894 A1 | 9/2014 | Weaver |
| 2014/0265897 A1 | 9/2014 | Taipale et al. |
| 2014/0313719 A1 | 10/2014 | Wang et al. |
| 2014/0320027 A1 | 10/2014 | Reed |
| 2014/0359078 A1 | 12/2014 | Liu |
| 2015/0015716 A1 | 1/2015 | Reed et al. |
| 2015/0028693 A1 | 1/2015 | Reed |
| 2015/0069920 A1 | 3/2015 | Denteneer et al. |
| 2015/0077019 A1 | 3/2015 | Reed et al. |
| 2015/0084520 A1 | 3/2015 | Reed |
| 2015/0123563 A1 | 5/2015 | Dahlen |
| 2015/0137693 A1 | 5/2015 | Reed |
| 2015/0160305 A1 | 6/2015 | Ilyes et al. |
| 2015/0208479 A1 | 7/2015 | Radermacher et al. |
| 2015/0237693 A1* | 8/2015 | Knoedgen ............ H05B 45/10 315/224 |
| 2015/0280782 A1 | 10/2015 | Airbinger et al. |
| 2015/0312983 A1 | 10/2015 | Hu et al. |
| 2016/0021713 A1 | 1/2016 | Reed |
| 2016/0037605 A1 | 2/2016 | Reed et al. |
| 2016/0113084 A1 | 4/2016 | White et al. |
| 2016/0150622 A1 | 5/2016 | Flinsenberg et al. |
| 2016/0195434 A1 | 7/2016 | Roberts |
| 2016/0234899 A1 | 8/2016 | Reed et al. |
| 2016/0286623 A1 | 9/2016 | Reed |
| 2016/0295656 A1 | 10/2016 | Lenk |
| 2016/0323955 A1 | 11/2016 | Reed |
| 2017/0055324 A1 | 2/2017 | Reed |
| 2017/0164439 A1 | 6/2017 | Reed |
| 2017/0311424 A1 | 10/2017 | Vendetti et al. |
| 2018/0035518 A1 | 2/2018 | Cook |
| 2018/0083438 A1 | 3/2018 | Reed |
| 2018/0083539 A1 | 3/2018 | Reed |
| 2018/0288860 A1 | 10/2018 | Vendetti et al. |
| 2018/0338367 A1 | 11/2018 | Reed |
| 2018/0352627 A1 | 12/2018 | Seki et al. |
| 2019/0098723 A1 | 3/2019 | Sadwick et al. |
| 2019/0394862 A1 | 12/2019 | Vendetti et al. |
| 2020/0029404 A1 | 1/2020 | Reed |
| 2020/0045794 A1 | 2/2020 | Reed et al. |
| 2020/0375000 A1 | 11/2020 | Reed |
| 2020/0404763 A1 | 12/2020 | Reed et al. |
| 2021/0136886 A1 | 5/2021 | Reed |

FOREIGN PATENT DOCUMENTS

| | | |
|---|---|---|
| EP | 1734795 A1 | 12/2006 |
| EP | 2320713 A2 | 5/2011 |
| EP | 2559937 A1 | 2/2013 |
| EP | 2629491 A1 | 8/2013 |
| EP | 1459600 B1 | 2/2014 |
| EP | 2781138 A1 | 9/2014 |
| FR | 2883306 A1 | 9/2006 |
| JP | 6-335241 A | 12/1994 |
| JP | 2001333420 A | 11/2001 |
| JP | 2004279668 A | 10/2004 |
| JP | 2004320024 A | 11/2004 |
| JP | 2004349065 A | 12/2004 |
| JP | 2005078403 A | 3/2005 |
| JP | 2005093171 A | 4/2005 |
| JP | 2005198238 | 7/2005 |
| JP | 2005198238 A | 7/2005 |
| JP | 2005310997 A | 11/2005 |
| JP | 2006179672 A | 7/2006 |
| JP | 2006244711 A | 9/2006 |
| JP | 200859811 | 3/2008 |
| JP | 2008059811 A | 3/2008 |
| JP | 2008509538 | 3/2008 |
| JP | 2008509538 A | 3/2008 |
| JP | 2008130523 A | 6/2008 |
| JP | 2008159483 A | 7/2008 |
| JP | 2008177144 A | 7/2008 |
| JP | 2008529177 A | 7/2008 |
| JP | 2008535279 A | 8/2008 |
| JP | 2010504628 A | 2/2010 |
| JP | 6335241 B2 | 5/2018 |
| KR | 20050078403 A | 8/2005 |
| KR | 1020050078403 | 8/2005 |
| KR | 20060071869 A | 6/2006 |
| KR | 20060086254 A | 7/2006 |
| KR | 1020060086254 | 7/2006 |
| KR | 20080100140 A | 11/2008 |
| KR | 20090042400 A | 4/2009 |
| KR | 1020090042400 | 4/2009 |
| KR | 100935736 B1 | 1/2010 |
| KR | 2020100007230 | 7/2010 |

(56) References Cited

FOREIGN PATENT DOCUMENTS

| KR | 101001276 B1 | 12/2010 |
|---|---|---|
| KR | 101044224 B1 | 6/2011 |
| KR | 101150876 B1 | 5/2012 |
| WO | 02076068 A1 | 9/2002 |
| WO | 02076069 A1 | 9/2002 |
| WO | 03/056882 | 7/2003 |
| WO | 03056882 A1 | 7/2003 |
| WO | 2005003625 A1 | 1/2005 |
| WO | 2006057866 A2 | 6/2006 |
| WO | 2007023454 A1 | 3/2007 |
| WO | 2007036873 A2 | 4/2007 |
| WO | 2008030450 A2 | 3/2008 |
| WO | 2008034242 A1 | 3/2008 |
| WO | 2009040703 A2 | 4/2009 |
| WO | 2010057115 A2 | 5/2010 |
| WO | 2010085882 A1 | 8/2010 |
| WO | 2010086757 A1 | 8/2010 |
| WO | 2010133719 A1 | 11/2010 |
| WO | 2011063302 A2 | 5/2011 |
| WO | 2011129309 A1 | 10/2011 |
| WO | 2012006710 A1 | 1/2012 |
| WO | 2012142115 A2 | 10/2012 |
| WO | 2013028834 A1 | 2/2013 |
| WO | 2013074900 A1 | 5/2013 |
| WO | 2014018773 A1 | 1/2014 |
| WO | 2014039683 A1 | 3/2014 |
| WO | 2014078854 A1 | 5/2014 |

OTHER PUBLICATIONS

Corrected Notice of Allowance, mailed Aug. 12, 2015, and Notice of Allowance, mailed Jul. 31, 2015 for Reed et al., "Remotely Adjustable Solid-State Lamp," U.S. Apple. No. 13/875,130, 11 pages.
Corrected Notice of Allowance, mailed Aug. 12, 2015, and Notice of Allowance, mailed Jul. 31, 2015 for Reed et al., "Remotely Adjustable Solid-State Lamp," U.S. Appl. No. 13/875,130, 11 pages.
EE Herald, "Devices to protect High brightness LED from ESD, "dated Mar. 16, 2009, retrieved Jun. 10, 2011, from http://www.eeherald.com/section/new-products/np100779.html, 1 page.
European Office Action, dated Aug. 11, 2017, for European Application No. 13 823 055.2-1802, 4 pages.
Extended European Search Report dated Aug. 25, 2016, for corresponding EP Application No. 14843796.5-1757, 6 pages.
Extended European Search Report dated Jan. 4, 2016, for corresponding EP Application No. 13823055.2-1802, 7 pages.
Extended European Search Report dated Oct. 21, 2015, for corresponding EP Application No. 13835001.2-1802, 7 pages.
Extended European Search Report, dated Aug. 13, 2014, for corresponding European Application No. 09826926.9, 8 pages.
Extended European Search Report, dated May 3, 2016, for corresponding European Application No. 12771286.7, 9 pages.
Extended European Search Report, dated Sep. 28, 2015, for corresponding European Application No. 12850159.0-1802, 6 pages.
Fairchild Semiconductor, "LED Application Design Guide Using Half-Bridge LLC Resonant Converter for 100W Street Lighting, "AN-9729, Fairchild Semiconductor Corporation, Rev. 1.0.0, Mar. 22, 2011, 17 pages.
Huang, "Designing an LLC Resonant Half-Bridge Power Converter, "2010 Texas Instruments Power Supply Design Seminar, SEM1900, Topic 3, TI Literature No. SLUP263, Copyright 2010, 2011, Texas Instruments Incorporated, 28 pages.
International Search Report and Written Opinion, mailed Feb. 29, 2016, for PCT/US2015/053000, 20 pages.
International Search Report and Written Opinion, mailed Feb. 29, 2016, for PCT/US2015/053006, 21 pages.
International Search Report and Written Opinion, malled Jan. 13, 2016. for PCT/US2015/053009, 15 pages.

International Search Report mailed Nov. 11, 2014, for International Application No. PCT/US2014/047867, 3 pages.
International Search Report, mailed Dec. 13, 2010 for PCT/US2010/035649, 3 pages.
International Search Report, mailed Dec. 15, 2010 for PCT/US2010/035658, 3 pages.
International Search Report, mailed Dec. 28, 2010 for PCT/US2010/035651, 3 pages.
International Search Report, mailed Dec. 30, 2013 for PCT/US2013/058266, 3 pages.
International Search Report, mailed Feb. 26, 2014, for PCT/US2013/070794, 3 pages.
International Search Report, mailed Feb. 27, 2013, for PCT/US2012/065476, 3 pages.
International Search Report, mailed Jan. 14, 2013, for PCT/US2012/052009, 3 pages.
International Search Report, mailed Jul. 9, 2009 for PCT/US2009/043171, 5 pages.
International Search Report, mailed Jun. 21, 2010, for PCT/US2009/064625, 3 pages.
International Search Report, mailed Nov. 19, 2013 for PCT/US2013/052092, 4 pages.
International Search Report, mailed Oct. 8, 2012 for PCT/US2012/033059, 3 pages.
International Search Report, mailed Sep. 30, 2011, for PCT/US2011/021359, 3 pages.
Japanese Office Action, dated Jan. 6, 2015, for corresponding Japanese Application No. 2011-536564, 6 pages.
Kadirvel et al., "Self-Powered, Ambient Light Sensor Using bq25504," Texas Instruments, Application Report, SLUA629—Jan. 2012, 6 pages.
Littelfuse, "Application Note: Protecting LEDs in Product Designs," 2009, 2 pages.
Non-Final Office Action Issued in U.S. Appl. No. 16/842,924, Mailed Jun. 3, 2021, 13 pages.
Notice of Allowance mailed Apr. 11, 2014, for Reed, "Apparatus and Method of Energy Efficient Illumination," U.S. Appl. No. 13/943,537, 9 pages.
Notice of Allowance mailed Apr. 12, 2013, for Reed, "Apparatus and Method of Energy Efficient Illumination," U.S. Appl. No. 12/784,093, 9 pages.
Notice of Allowance mailed Apr. 27, 2015, for Reed et al., "Apparatus and Method of Operating a Luminaire," U.S. Appl. No. 13/558,191, 8 pages.
Notice of Allowance mailed Aug. 29, 2014, for Reed et al., "Adjustable Output Solid-State Lamp With Security Features," U.S. Appl. No. 13/679,687, 9 pages.
Notice Of Allowance mailed Jul. 1, 2014, for Reed, "Luminaire With Atmospheric Electrical Activity Detection and Visual Alert Capabilities," U.S. Appl. No. 13/786,114, 9 pages.
Notice of Allowance mailed Jul. 30, 2014, for Reed, "Apparatus and Method of Energy Efficient Illumination Using Received Signals," U.S. Appl. No. 13/085,301, 5 pages.
Notice of Allowance mailed Jul. 7, 2014, for Reed et al., "Apparatus and Method for Schedule Based Operation of a Luminaire," U.S. Appl. No. 13/604,327, 8 pages.
Notice of Allowance mailed Jun. 19, 2015, for Reed et al., "Apparatus and Method for Schedule Based Operation of a Luminaire" U.S. Appl. No. 14/552,274, 9 pages.
Notice Of Allowance mailed Jun. 20, 2014, for Reed et al., "Long-Range Motion Detection for Illumination Control," U.S. Appl. No. 12/784,080, 7 pages.
Notice of Allowance mailed Mar. 16, 2017, for U.S. Appl. No. 14/552,274, Reed et al., "Apparatus and Method for Schedule Based Operation of a Luminaire," 9 pages.
Notice of Allowance mailed Mar. 24, 2017, for Reed, "Apparatus and Method of Energy Efficient Illumination Using Received Signals," U.S. Appl. No. 14/557,275, 23 pages.
Notice of Allowance mailed May 23, 2013, for Reed, "Apparatus and Method of Energy Efficient Illumination," U.S. Appl. No. 12/784,091, 6 pages.

(56) References Cited

OTHER PUBLICATIONS

Notice of Allowance mailed Nov. 22, 2021, for Deed, "Photocontroller To Control Operation of a Luminaire Having a Dimming Line " U.S. Appl. No. 16/842,924, 9 pages.
Notice of Allowance mailed Nov. 5, 2014, for Reed, "Apparatus and Method of Energy Efficient Illumination," U.S. Appl. No. 14/329,508, 10 pages.
Notice of Allowance mailed Oct. 5, 2016 for U.S. Appl. No. 14/869,511, Reed, "Centralized Control of Area Lighting Hours of Illumination," 8 pages.
Notice of Allowance mailed Sep. 12, 2013, for Reed, "Electrostatic Discharge Protection for Luminaire," U.S. Appl. No. 13/212,074, 6 pages.
Notice of Allowance mailed Sep. 30, 2013, for Reed, "Resonant Network for Reduction of Flicker Perception in Solid State Lighting Systems," U.S. Appl. No. 13/592,590, 9 pages.
Notice of Allowance, dated Oct. 14, 2011, for Reed et al., "Low-Profile Pathway Illumination System," U.S. Appl. No. 12/437,472, 9 pages.
Notice of Allowance, mailed Jun. 14, 2017, for U.S. Appl. No. 14/557,275, Reed, "Apparatus and Method of Energy Efficient Illumination Using Received Signals," 2 pages.
Notice of Allowance, mailed Jun. 22, 2017, for U.S. Appl. No. 14/816,754, Reed et al., "Apparatus and Method of Operating a Luminaire ," 11 pages.
Office Action for U.S. Appl. No. 16/408,875 mailed May 19, 2020, 21 pages.
Office Action mailed Apr. 21, 2015, for Reed et al., "Remotely Adjustable Solid-State Lamp," U.S. Appl. No. 13/875,130, 10 pages.
Office Action mailed Apr. 23, 2014, for Reed, "Apparatus and Method of Energy Efficient Illumination Using Received Signals," U.S. Appl. No. 13/085,301, 12 pages.
Office Action mailed Apr. 24, 2013, for Reed, "Apparatus and Method of Energy Efficient Illumination," U.S. Appl. No. 12/784,091, 12 pages.
Office Action mailed Aug. 23, 2016, for Reed, "Apparatus and Method of Energy Efficient Illumination Using Received Signals," U.S. Appl. No. 14/557,275, 23 pages.
Office Action mailed Aug. 28, 2014, for Reed, "Apparatus and Method of Energy Efficient Illumination," U.S. Appl. No. 14/329,508, 8 pages.
Office Action mailed Aug. 31, 2016, for U.S. Appl. No. 14/869,501, Reed, "Asset Management System for Outdoor Luminaires," 15 pages.
Office Action mailed Dec. 17, 2014, for Reed, "Luminaire With Ambient Sensing and Autonomous Control Capabilities," U.S. Appl. No. 13/786,332, 20 pages.
Office Action mailed Dec. 21, 2012, for Reed et al., "Long-Range Motion Detection for Illumination Control," U.S. Appl. No. 12/784,080, 26 pages.
Office Action mailed Dec. 22, 2014, for Reed et al., "Apparatus and Method of Operating a Luminaire," U.S. Appl. No. 13/558,191, 17 pages.
Office Action mailed Dec. 5, 2012, for Reed, "Apparatus and Method of Energy Efficient Illumination," U.S. Appl. No. 12/784,091, 18 pages.
Office Action mailed Dec. 5, 2012, for Reed, "Apparatus and Method of Energy Efficient Illumination," U.S. Appl. No. 12/784,093, 13 pages.
Office Action mailed Feb. 17, 2017, for U.S. Appl. No. 14/939,856, Reed et al., "Luminaire With Adjustable Illumination Pattern," 13 pages.
Office Action mailed Feb. 27, 2014, for Reed et al., "Adjustable Output Solid-State Lamp With Security Features," U.S. Appl. No. 13/679,687, 11 pages.
Office Action mailed Jan. 30, 2014, for Reed et al., "Long-Range Motion Detection for Illumination Control," U.S. Appl. No. 12/784,080, 26 pages.
Office Action mailed Jul. 22, 2013, for Reed et al., "Long-Range Motion Detection for Illumination Control," U.S. Appl. No. 12/784,080, 29 pages.
Office Action mailed Mar. 15, 2013 for Reed et al., "Electrostatic Discharge Protection for Luminaire," U.S. Appl. No. 13/212,074, 11 pages.
Office Action mailed Mar. 2, 2015, for Reed et al., "Apparatus and Method for Schedule Based Operations of a Luminaire," U.S. Appl. No. 14/552,274, 7 pages.
Office Action mailed Mar. 26, 2014, for Reed et al., "Apparatus and Method for Schedule Based Operation of a Luminaire," U.S. Appl. No. 13/604,327, 10 pages.
Office Action mailed Nov. 27, 2013, for Reed, "Apparatus and Method of Energy Efficient Illumination," U.S. Appl. No. 13/943,537, 8 pages.
Office Action mailed Oct. 1, 2013, for Reed, "Apparatus and Method of Energy Efficient Illumination Using Received Signals," U.S. Appl. No. 13/085,301, 11 pages.
Office Action mailed Sep. 19, 2016, for U.S. Appl. No. 14/552,274, Reed et al., "Apparatus and Method for Schedule Based Operation of a Luminaire," 9 pages.
Office Action, dated May 5, 2011, for Reed et al., "Low-Profile Pathway Illumination System," U.S. Appl. No. 12/437,472, 24 pages.
Panasonic Electronic Components, "LED Lighting Solutions," 2009, 6 pages.
Read et al., "Remotely Adjustable Solid-State Lamp," U.S. Appl. No. 13/875,130, filed May 1, 2013, 65 pages.
Reed et al., "Adjustable Output Solid-State Lamp With Security Features," Amendment filed Jun. 24, 2014, for U.S. Appl. No. 13/679,687, 11 pages.
Reed et al., "Adjustable Output Solid-State Lamp With Security Features," U.S. Appl. No. 61/561,616, filed Nov. 18, 2011, 33 pages.
Reed et al., "Apparatus and Method for Schedule Based Operation of a Luminaire" Amendment filed Dec. 7, 2016, for U.S. Appl. No. 14/552,274, 11 pages.
Reed et al., "Apparatus and Method for Schedule Based Operation of a Luminaire" Amendment filed Jun. 1, 2015, for U.S. Appl. No. 14/552,274, 14 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Amendment filed Jun. 7, 2016, for U.S. Appl. No. 14/552,274, 14 pages.
Reed et al., "Apparatus and Method for Schedule Based Operation of a Luminaire" U.S. Appl. No. 13/604,327, filed Sep. 5, 2012, 44 pages.
Reed et al., "Apparatus and Method of Operating a Luminaire," U.S. Appl. No. 13/558,191, filed Jul. 25, 2012, 84 pages.
Reed et al., "Apparatus, Method to Change Light Source Color Temperature with Reduced Optical Filtering Losses,"U.S. Appl. No. 61/295,519, filed Jan. 15, 2010, 35 pages.
Reed et al., "Apparatus, Method To Change Light Source Color Temperature With Reduced Optical Filtering Losses," U.S. Appl. No. 13/007,080, filed Jan. 14, 2011, 45 pages.
Reed et al., "Apparatus, Method To Change Light Source Color Temperature With Reduced Optical Filtering Losses,"U.S. Appl. No. 61/406,490, filed Oct. 25, 2010, 46 pages.
Reed et al., "Apparatus, Method To Enhance Color Contrast in Phosphor-Based Solid State Lights," U.S. Appl. No. 61/534,722, filed Sep. 14, 2011, 53 pages.
Reed et al., "Electrically Isolated Heat Sink for Solid-State Light,"U.S. Appl. No. 61/229,435, filed Jul. 29, 2009, 29 pages.
Reed et al., "Gas-Discharge Lamp Replacement With Passive Cooling,"U.S. Appl. No. 61/174,913, filed May 1, 2009, 29 pages.
Reed et al., "Gas-Discharge Lamp Replacement," U.S. Appl. No. 61/052,924, filed May 13, 2008, 32 pages.
Reed et al., "Long-Range Motion Detection for Illumination Control, "U.S. Appl. No. 61/180,017, filed May 20, 2009, 32 pages.
Reed et al., "Long-Range Motion Detection for Illumination Control," Amendment filed Apr. 22, 2013, for U.S. Appl. No. 12/784,080, 17 pages.

(56) References Cited

OTHER PUBLICATIONS

Reed et al., "Long-Range Motion Detection for Illumination Control," Amendment filed Apr. 28, 2014, for U.S. Appl. No. 12/784,080, 20 pages.
Reed et al., "Long-Range Motion Detection for Illumination Control," Amendment filed Dec. 10, 2015, for U.S. Appl. No. 14/500,512, 18 pages.
Reed et al., "Long-Range Motion Detection for Illumination Control," Amendment filed Sep. 27, 2013, for U.S. Appl. No. 12/784,080, 20 pages.
Reed et al., "Long-Range Motion Detection for Illumination Control," Office Action mailed Mar. 4, 2016, for U.S. Appl. No. 14/500,512, 18 pages.
Reed et al., "Long-Range Motion Detection for Illumination Control," Office Action mailed Sep. 17, 2015, for U.S. Appl. No. 14/500,512, 17 pages.
Reed et al., "Long-Range Motion Detection for Illumination Control," U.S. Appl. No. 12/784,080, filed May 20, 2010, 32 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," U.S. Appl. No. 61/051,619, filed May 8, 2008, 25 pages.
Reed et al., "Luminaire With Adjustable Illumination Pattern," U.S. Appl. No. 14/939,856, filed Nov. 12, 2015, 69 pages.
Reed et al., "Remotely Adjustable Solid-State Lamp," Amendment filed Apr. 1, 2015, for U.S. Appl. No. 13/875,130, 14 pages.
Reed et al., "Remotely Adjustable Solid-State Lamp," Amendment filed Jul. 20, 2015, for U.S. Appl. No. 13/875,130, 15 pages.
Reed et al., "Remotely Adjustable Solid-State Lamp,"U.S. Appl. No. 61/641,781, filed May 2, 2012, 65 pages.
Reed et al., "Systems and Methods That Employ Object Recognition," Amendment filed Jul. 7, 2015, for U.S. Appl. No. 13/411,321, 21 pages.
Reed et al., "Systems and Methods That Employ Object Recognition," Amendment filed Mar. 7, 2016, for U.S. Appl. No. 13/411,321, 16 pages.
Reed et al., "Systems and Methods That Employ Object Recognition," Amendment filed May 6, 2015, for U.S. Appl. No. 13/411,321, 21 pages.
Reed et al., "Systems and Methods That Employ Object Recognition," Office Action mailed Dec. 7, 2015, for U.S. Appl. No. 13/411,321, 47 pages.
Reed et al., "Systems and Methods That Employ Object Recognition," U.S. Appl. No. 13/411,321, filed Mar. 2, 2012, 51 pages.
Reed et al., "Turbulent Flow Cooling for Electronic Ballast," U.S. Appl. No. 61/088,651, filed Aug. 13, 2008, 23 pages.
Reed et al., "Systems and Methods That Employ Object Recognition," Amendment filed Nov. 21, 2014, for U.S. Appl. No. 13/411,321, 20 pages.
Reed et al., "Systems and Methods That Employ Object Recognition," Office Action mailed Aug. 25, 2014, for U.S. Appl. No. 13/411,321, 35 pages.
Reed et al., "Systems and Methods That Employ Object Recognition," Office Action mailed Feb. 9, 2015, for U.S. Appl. No. 13/411,321, 40 pages.
Reed, "Adjustable Output Solid-State Lighting Device," Amendment filed Jan. 8, 2016, for U.S. Appl. No. 13/707,123, 11 pages.
Reed, "Adjustable Output Solid-State Lighting Device," Notice of Allowance mailed Feb. 25, 2016, for U.S. Appl. No. 13/707,123, 9 pages.
Reed, "Adjustable Output Solid-State Lighting Device," Office Action mailed Oct. 5, 2015, for U.S. Appl. No. 13/707,123, 24 pages.
Reed, "Adjustable Output Solid-State Lighting Device,"U.S. Appl. No. 61/567,308, filed Dec. 6, 2011, 49 pages.
Reed, "Ambient Light Control in Solid State Lamps and Luminaires,"U.S. Appl. No. 61/933,733, filed Jan. 30, 2014, 8 pages.
Reed, "Apparatus and Method of Energy Efficient Illumination Using Received Signals ," U.S. Appl. No. 13/085,301, filed Apr. 12, 2011, 99 pages.
Reed, "Apparatus and Method of Energy Efficient Illumination Using Received Signals," Amendment filed Jan. 2, 2014, for U.S. Appl. No. 13/085,301, 26 pages.
Reed, "Apparatus and Method of Energy Efficient Illumination Using Received Signals," Amendment filed Jul. 23, 2014, for U.S. Appl. No. 13/085,301, 12 pages.
Reed, "Adjustable Output Solid-State Lighting Device," Amendment filed Apr. 2, 2015, for U.S. Appl. No. 13/707,123, 14 pages.
Reed, "Adjustable Output Solid-State Lighting Device," Office Acton mailed Jan. 2, 2015, for U.S. Appl. No. 13/707,123, 24 pages.
Reed, "Ambient Light Control in Solid State Lamps and Luminaires," Amendment filed Jan. 29, 2015, for U.S. Appl. No. 14/609,168, 12 pages.
Reed, "Ambient Light Control in Solid State Lamps and Luminaires," U.S. Appl. No. 14/609,168, filed Jan. 29, 2015, 77 pages.
Reed et al., "Apparatus and Method of Operating a Luminaire," Amendment filed Mar. 19, 2015, for U.S. Appl. No. 13/558,191, 20 pages., Mar. 19, 2015.
Reed, "Apparatus and Method of Energy Efficient Illumination,"U.S. Appl. No. 61/333,983, filed May 12, 2010, 57 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," U.S. Appl. No. 61/346,263, filed May 19, 2010, 67 pages.
Reed, "Asset Management System for Outdoor Luminaires," U.S. Appl. No. 14/869,501, filed Sep. 29, 2015, 57 pages.
Reed, "Asset Management System for Outdoor Luminaires," U.S. Appl. No. 62/082,463, filed Nov. 20, 2014, 56 pages.
Reed, "Centralized Control Area Lighting Hours of Illumination," U.S. Appl. No. 14/869,511, filed Sep. 29, 2015, 39 pages.
Reed, "Centralized Control Area Lighting Hours of Illumination," U.S. Appl. No. 62/057,419, filed Sep. 30, 2014, 39 pages.
Reed, "Centralized Control of Area Lighting Hours of Illumination," Office Action mailed Mar. 24, 2016 for U.S. Appl. No. 14/869,511, 31 pages.
Reed, "Detection and Correction of Faulty Photo Controls in Outdoor Luminaires," Notice of Allowance mailed May 19, 2016 for U.S. Appl. No. 14/869,492, 9 pages.
Reed, "Detection and Correction of Faulty Photo Controls in Outdoor Luminaires," U.S. Appl. No. 14/869,492, filed Sep. 29, 2015, 71 pages.
Reed, "Detection and Correction of Faulty Photo Controls in Outdoor Luminaires," U.S. Appl. No. 62/068,517, filed Oct. 24, 2014, 47 pages.
Reed, "Detection and Correction of Faulty Photo Controls in Outdoor Luminaires," U.S. Appl. No. 62/183,505, filed Jun. 23, 2015, 71 pages.
Reed, "Electronic Control To Regulate Power for Solid-State Lighting and Methods Thereof,"Office Action mailed Feb. 28, 2013, for U.S. Appl. No. 12/619,535, 17 pages.
Reed, "Electronic Control To Regulate Power for Solid-State Lighting and Methods Thereof,"Office Action mailed Mar. 26, 2014, for U.S. Appl. No. 12/619,535, 16 pages.
Reed, "Electronic Control To Regulate Power for Solid-State Lighting and Methods Thereof," Amendment filed May 23, 2017 for U.S. Appl. No. 14/806,500, 11 pages.
Reed, "Electronic Control To Regulate Power for Solid-State Lighting and Methods Thereof," Office Action mailed Sep. 6, 2016 for U.S. Appl. No. 14/806,500, 18 pages.
Reed, "Electronic Control To Regulate Power for Solid-State Lighting and Methods Thereof," Response Under 37 CFR 1.116 filed Dec. 5, 2016 for U.S. Appl. No. 14/806,500, 12 pages.

(56) References Cited

OTHER PUBLICATIONS

Reed, "Electronic Control To Regulate Power for Solid-State Lighting and Methods Thereof," U.S. Appl. No. 61/115,438, filed Nov. 17, 2008, 51 pages.
Reed, "Electronic Control To Regulate Power for Solid-State Lighting and Methods Thereof," U.S. Appl. No. 61/154,619, filed Feb. 23, 2009, 62 pages.
Reed, "Electronic Control To Regulate Power for Solid-State Lighting and Methods Thereof," U.S. Appl. No. 14/806,500, filed Jul. 22, 2015, 52 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," U.S. Appl. No. 13/212,074, filed Aug. 17, 2011, 30 pages.
Reed, "High Efficiency Power Controller for Luminaire," Office Action mailed Sep. 10, 2015, for U.S. Appl. No. 14/546,354, 15 pages.
Reed, "Low Power Photocontrol for Luminaire," U.S. Appl. No. 62/137,666, filed Mar. 24, 2015, 36 pages.
Reed, "High Efficiency Power Controller for Luminaire,"U.S. Appl. No. 61/905,699, filed Nov. 18, 2013, 5 pages.
Reed, "Low Power Photocontrol for Luminaire," Amendment filed Jun. 13, 2016, for U.S. Appl. No. 14/844,944, 10 pages.
Reed, "Low Power Photocontrol for Luminaire," Notice of Allowance mailed Aug. 24, 2016, for U.S. Appl. No. 14/844,944, 7 pages.
Reed, "Low Power Photocontrol for Luminaire," U.S. Appl. No. 14/844,944, filed Sep. 3, 2015, 45 pages.
Reed, "Low Power Photocontrol for Luminaire," U.S. Appl. No. 14/994,569, filed Jan. 13, 2016, 36 pages.
Reed, "Apparatus and Method of Energy Efficient Illumination Using Received Signals," U.S. Appl. No. 14/557,275, filed Dec. 1, 2014, 92 pages.
Reed, "Apparatus and Method of Energy Efficient Illumination," U.S. Appl. No. 13/943,537, filed Jul. 16, 2013, 67 pages.
Reed, "Apparatus and Method of Energy Efficient Illumination," U.S. Appl. No. 14/329,508, filed Jul. 11, 2014, 61 pages.
Reed, "Electronic Control To Regulate Power for Solid-State Lighting and Methods Thereof," Amendment filed Dec. 15, 2014, for U.S. Appl. No. 12/619,535, 21 pages.
Reed, "Electronic Control To Regulate Power for Solid-State Lighting and Methods Thereof," Amendment filed May 24, 2013, for U.S. Appl. No. 12/619,535, 21 pages.
Reed, "Electronic Control To Regulate Power for Solid-State Lighting and Methods Thereof," Amendment filed May 27, 2014, for U.S. Appl. No. 12/619,535, 22 pages.
Reed, "Electronic Control To Regulate Power for Solid-State Lighting and Methods Thereof," Amendment filed Oct. 30, 2013, for U.S. Appl. No. 12/619,535, 5 pages.
Reed, "Electronic Control To Regulate Power for Solid-State Lighting and Methods Thereof," Office Action mailed Aug. 14, 2014, for U.S. Appl. No. 12/619,535, 16 pages.
Reed, "Electronic Control To Regulate Power for Solid-State Lighting and Methods Thereof," Office Action mailed Jul. 30, 2013, for U.S. Appl. No. 12/619,535, 15 pages.
Reed, "High Efficiency Power Controller for Luminaire," Amendment filed Feb. 9, 2016, for U.S. Appl. No. 14/546,354, 11 pages.
Reed, "High Efficiency Power Controller for Luminaire," U.S. Appl. No. 14/546,354, filed Nov. 18, 2014, 33 pages.
Reed, "High Reliability Photocontrol Controls With 0 TO 10 Volt Dimming Signal Line and Method," U.S. Appl. No. 62/507,730, filed May 17, 2017, 17 pages.
Reed, "Luminaire With Ambient Sensing and Autonomous Control Capabilities," Amendment filed Jul. 23, 2015, for U.S. Appl. No. 13/786,332, 17 pages.
Reed, "Luminaire With Ambient Sensing and Autonomous Control Capabilities," Amendment filed Mar. 13, 2015, for U.S. Appl. No. 13/786,332, 23 pages.
Reed, "Luminaire With Ambient Sensing and Autonomous Control Capabilities," Notice of Allowance mailed Aug. 6, 2015, for U.S. Appl. No. 13/786,332, 8 pages.
Reed, "Luminaire With Ambient Sensing and Autonomous Control Capabilities," Notice of Allowance mailed May 4, 2016, for U.S. Appl. No. 14/950,823, 10 pages.
Reed, "Luminaire With Ambient Sensing and Autonomous Control Capabilities," Office Action mailed May 29, 2015, for U.S. Appl. No. 13/786,332, 7 pages.
Reed, "Luminaire With Ambient Sensing and Autonomous Control Capabilities," U.S. Appl. No. 14/950,823, filed Nov. 24, 2015, 72 pages.
Reed, "Luminaire With Ambient Sensing and Autonomous Control Capabilities,"U.S. Appl. No. 61/728,150, filed Nov. 19, 2012, 83 pages.
Reed, "Luminaire With Atmospheric Electricl Activity Detection and Visual Alert Capabilities," U.S. Appl. No. 61/694,159.
Reed, "Luminaire With Switch-Mode Converter Power Monitoring," Notice of Allowance mailed Nov. 18, 2015, for U.S. Appl. No. 14/074,166, 9 pages.
Reed, "Luminaire With Switch-Mode Converter Power Monitoring,"U.S. Appl. No. 61/723,675, filed Nov. 7, 2012, 73 pages.
Reed, "Photocontrol for Luminaire Consumes Very Low Power,"U.S. Appl. No. 61/849,841, filed Jul. 24, 2013, 41 pages.
Reed, "Resonant Network for Reduction of Flicker Perception in Solid State Lighting Systems," U.S. Appl. No. 61/527,029, filed Aug. 24, 2011, 41 pages.
Reed, "Solid State Hospitality Lamp," U.S. Appl. No. 61/692,619, filed Aug. 23, 2012, 32 pages.
Reed, "Solid State Lighting, Drive Circuit and Method of Driving Same," Notice of Allowance Mailed Aug. 4, 2015, for U.S. Appl. No. 13/875,000, 10 pages.
Reed, "Solid State Lighting, Drive Circuit and Method of Driving Same," U.S. Appl. No. 61/640,963, filed May 1, 2012, 24 pages.
Reed, "Systems, Methods, and Apparatuses for Using a High Current Switching Device as a Logic Level Sensor," Notice of Allowance for U.S. Appl. No. 14/179,737, mailed Nov. 6, 2015, 9 pages.
Reed, "Systems, Methods, and Apparatuses for Using a High Current Switching Device as a Logic Level Sensor," U.S. Appl. No. 61/764,395, filed Feb. 13, 2013, 48 pages.
Reed, "Luminaire With Adjustable Illumination Pattern," U.S. Appl. No. 62/114,826, filed Feb. 11, 2015, 68 pages.
Reed, "Luminaire With Ambient Sensing and Autonomous Control Capabilities," U.S. Appl. No. 13/786,332, filed Mar. 5, 2013, 86 pages.
Reed, "Luminaire With Atmospheric Electrical Activity Detection and Visual Alert Capabilities," U.S. Appl. No. 13/786,114, filed Mar. 5, 2013, 52 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Switch-Mode Converter Power Monitoring," U.S. Appl. No. 14/074,166, filed Nov. 7, 2013, 73 pages.
Reed, "Photocontrol for Luminaire Consumes Very Low Power," U.S. Appl. No. 14/158,630, filed Jan. 17, 2014, 71 pages.
Reed, "Solid State Hospitality Lamp," U.S. Appl. No. 13/973,696, filed Aug. 22, 2013, 32 pages.
Reed, "Solid State Lighting, Drive Circuit and Method of Driving Same," U.S. Appl. No. 13/875,000, filed May 1, 2013, 24 pages.
Reed, "Systems, Methods, and Apparatuses for Using a High Current Switching Device as a Logic Level Sensor," U.S. Appl. No. 14/179,737, filed Feb. 13, 2014, 48 pages.
Renesas Electronics, "Zener Diodes for Surge Absorption-Applications of high-intensity LED,"Apr. 2010, 1 page.
Renn et al., "Solid State Lighting Device and Method Employing Heat Exchanger Thermally Coupled Circuit Board," U.S. Appl. No. 61/357,421, filed Jun. 22, 2010, 49 pages.
Tyco Electronics, "Circuit Protection," retrieved Jun. 10, 2011, retrieved from http://www.tycoelectronics.com/en/products/circuit-protection.html, 2 pages.
Vendetti et al., "Luminaire Dimming Module Uses 3 Contact Nema Photocontrol Socket," U.S. Appl. No. 15/496,985, filed Apr. 25, 2017, 23 pages.

(56) References Cited

OTHER PUBLICATIONS

Vendetti et al., "Systems and Methods for Controlling Luminaire Wireless Network Using Smart Appliance," U.S. Appl. No. 62/458,970, filed Feb. 14, 2017, 50 pages.
Vendetti et al., "Systems and Methods for Controlling Outdoor Luminaire Wireless Network Using Smart Appliance," U.S. Appl. No. 15/895,439, filed Feb. 13, 2018, 50 pages.
Written Opinion mailed Nov. 11, 2014, for International Application No. PCT/US2014/047867, 5 pages.
Written Opinion, mailed Dec. 13, 2010 for PCT/US2010/035649, 4 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Dec. 30, 2013 for PCT/US2013/058266, 8 pages.
Written Opinion, mailed Feb. 26, 2014, for PCT/US2013/070794, 10 pages.
Written Opinion, mailed Feb. 27, 2013, for PCT/US2012/065476, 8 pages.
Written Opinion, mailed Jan. 14, 2013, for PCT/US2012/052009, 5 pages.
Written Opinion, mailed Jul. 9, 2009 for PCT/US2009/043171, 8 pages.
Written Opinion, mailed Jun. 21, 2010 for PCT/US2009/064625, 5 pages.
Written Opinion, mailed Nov. 19, 2013 for PCT/US2013/052092, 7 pages.
Written Opinion, mailed Oct. 8, 2012 for PCT/US2012/033059, 3 pages.
Written Opinion, mailed Sep. 30, 2011, for PCT/US2011/021359, 4 pages.

* cited by examiner

FIELD ADJUSTABLE OUTPUT FOR DIMMABLE LUMINAIRES

FIELD

The present application is directed to articles, apparatus and methods to adjust an output light level of a dimmable luminaire, for example a dimmable luminaire that employs light emitting diodes (LEDs).

BACKGROUND

Description of the Related Art

Modern luminaires for area, street or indoor lighting have circuitry which allows the light output of the luminaire to be reduced from a maximum light level to a lower light level, typically using a "0 to 10 volt" control line which is commonly referred to as a dimming line. The dimming line is a current source with a compliance of 0 to 10 volts DC. If a current sink, for example a resistor that connects the dimming line to ground, conducts current from the dimming line to ground, the voltage across the dimming line decreases from an unloaded voltage of 10 volts to some lower voltage. A light output of the luminaire dims in proportion to the lower voltage of the dimming line.

In solid-state light luminaires (e.g., light emitting diode (LED) luminaires), the solid-state light sources (e.g., LEDs) are powered by an LED driver which may have a dimming line input. The LED driver provides a source current for the dimming line and limits a maximum voltage of the dimming line to approximately 10 volts DC. The value of the current sourced (Idim) is determined by a design and manufacture of the specific LED driver and is typically not a programmable settable current.

A sampling of LED drivers demonstrates not only a wide range of dimming line source current values between different LED drivers, but also a wide range even within a single LED driver model from some manufacturers. For example, the data sheet for the Inventronics EUM-100SxxxLx series shows a range of 200 microamperes to 450 microamperes for the source current of the dimming line. Using a fixed value resistor to dim these widely varying dimming lines is impractical because of this wide range of dimming line source current values. To do so, a unique resistor value would need to be chosen for each luminaire to achieve the desired dimming value, which is clearly impractical when manufacturing hundreds of thousand luminaires per year. Notably, the applicable ANSI standard (ANSI C137.1-2019) provides voltage values for dimming but not source current value ranges.

A Field Adjustable Output (FAO) module is typically a printed circuit board with a rotary switch and resistors which are switched in to select the approximate current load for the desired dimming levels per switch position. A typical example of this is the SIGNIFY FAWS (Field Adjustable Wattage Switch). The FAWS can only practically be used with LED drivers having a tightly controlled and specific value source current on the dimming line. Use with other LED drivers will possibly result in widely incorrect dimming settings. Thus, the resistors values must be chosen for the specific LED driver model or manufacturer due to the relatively large and inconsistent variation in dimming line source currents between different LED drivers.

Improved approaches to diming controls for solid-state lighting are desirable.

BRIEF SUMMARY

Various implementations of articles, apparatus and methods are described herein to adjust an output light level of a dimmable luminaire, for example a dimmable luminaire that employs solid-state (e.g., light emitting diodes (LEDs)) and which is controlled via a dimming line. The various implementations can advantageously employ a voltage divider formed by a first resistance source, a second resistance source which is adjustable, and a shunt voltage regulator having a reference node coupled between the first and the second resistance sources to form the voltage divider, the first and the second resistance sources which provides a reference voltage to the shunt voltage regulator. The shunt voltage regulator is electrically coupled between an LED driver dimming line and a ground via first and second nodes of the shunt voltage regulator to regulate a flow of current from the LED driver dimming line based on the reference voltage supplied via the voltage divider. The second resistance source is electrically coupled in series with the first resistance source. The second resistance source can take the form of a plurality of discrete resistors, each having a respective value of resistance (i.e., a respective voltage drop thereacross) associated therewith. Alternatively, the second resistance source can take the form of a potentiometer having a continuously variable value of resistance associated therewith, and hence having continuously adjustable (e.g., non-integer, non-discrete) dimming settings available between a maximum dimming setting and a minimum dimming setting. At least one switch can allow selection or adjustment of a value of resistance provided by the second resistance source.

In addition, at least some implementations employ an "open collector" approach, which further advantageously allows for use with "peripheral" devices, for example for use with low power photocontrols, which can be added in parallel to a disclosed field adjustable output (FAO) controller and associated circuit thereof.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1A:
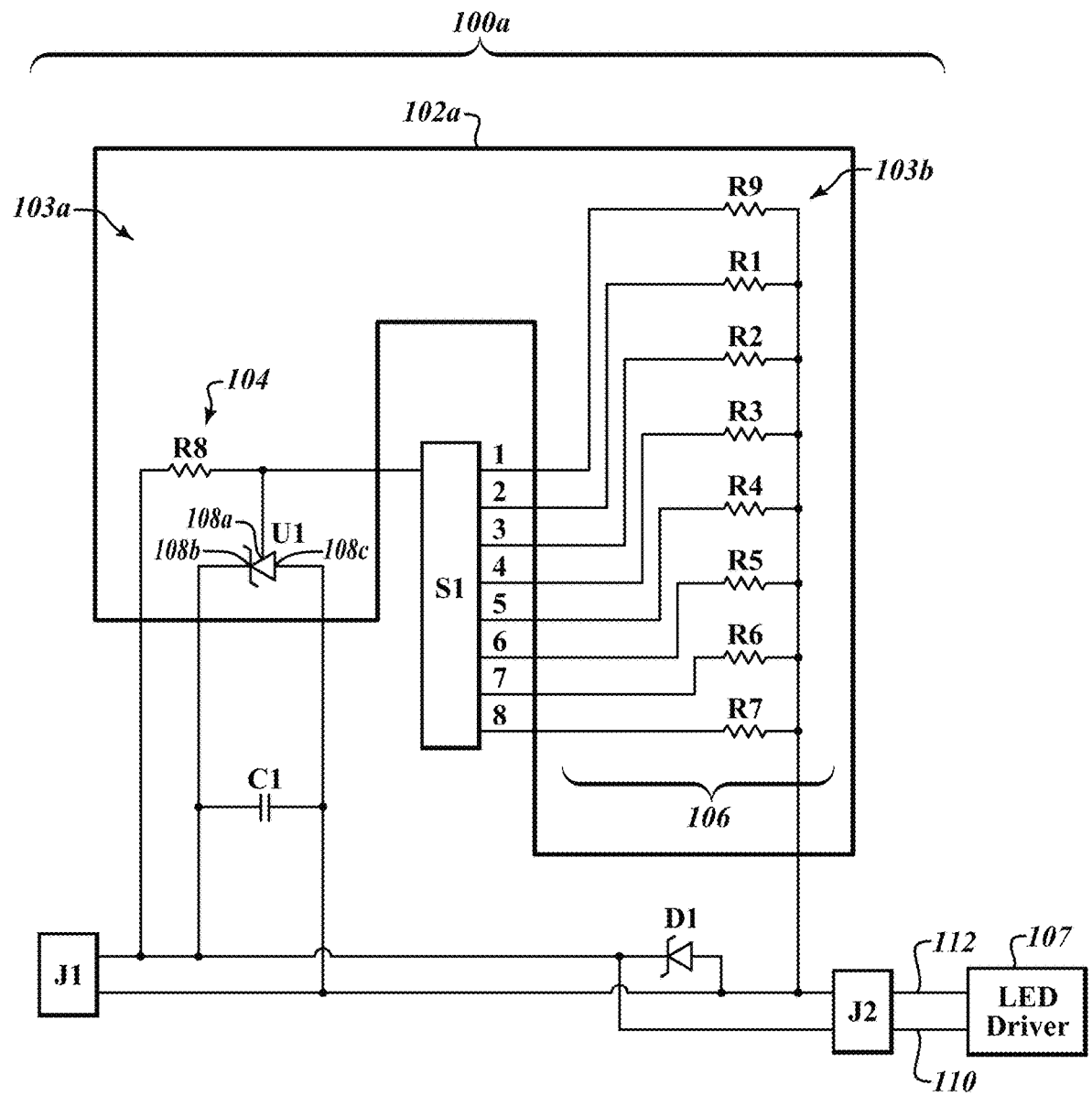
FIG. 1A is a schematic diagram of a field adjustable output control circuit usable with a luminaire to adjust dimming of solid state light sources thereof, according to at least one illustrated implementation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with luminaires, solid state lights for instance LEDs, drive circuits for instance LED drivers, potentiometers, photocontrols, and/or other peripheral components have not been shown or described in detail to avoid unnecessarily obscuring descriptions of the various implementations and embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one implementation" or "an implementation" or "one embodiment" or "an embodiment" means that a particular feature, structure or characteristic described in connection with the embodiment is included in at least one implementation or embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in this specification and the appended claims, the term "set" refers to a non-zero collection of members or elements.

As used in this specification and the appended claims, the term "node" refers to a point in an electric or electronic circuit. A node, for instance, may refer to a terminal of a circuit element or a point at which two or more terminals of circuit elements are joined.

Technologies described and depicted in the instant disclosure relate to articles, apparatus and methods that are operable to adjust an output light level of a dimmable luminaire, for example a dimmable luminaire that employs solid-state light sources for instance light emitting diodes (LEDs), and which is controlled via a dimming line. At least some implementations employ an "open collector" approach, which further advantageously allows for use with "peripheral" devices, for example use with low power photocontrols. The various described approaches can advantageously be employed to control an amount of illumination, a combined color temperature, and/or a throw pattern using a simple, and reliable circuit that accommodates a wide variety of LED drivers.

FIG. 1A shows a field adjustable output (FAO) control circuit 100a usable with a luminaire to adjust dimming, according to at least one illustrated implementation.

The FAO control circuit 100a includes a voltage divider 102a formed by a first source of resistance 104 and a second source of resistance 106 electrically couplable in series with the first source of resistance 104, and a shunt voltage regulator U1 electrically coupled between the first and the second sources of resistance 104, 106. The first source of resistance 104 is on one side 103a of the voltage divider 102 and the second source of resistance 106 is on the other side 103b of the voltage divider 102a and has a value of resistance that is adjustable or can be varied. The first source of resistance 104 is interchangeably referred to as a first resistance source and the second source of resistance 106 is interchangeably referred to as a second resistance source. The shunt voltage regulator U1 has a reference node 108a. The shunt voltage regulator U1 is illustrated as electrically coupled between an LED driver dimming line 110 and a ground 112 via first and second nodes 108b, 108c of the shunt voltage regulator U1 to regulate a flow of current from the LED driver dimming line 110 based on a reference voltage supplied to the reference node 108a via the first source of resistance 104 and the second source of resistance 106 of the voltage divider 102a. The shunt regulator U1 can be electrically coupled in parallel with the first and the second sources of resistance 104, 106 across the LED driver dimming line 110 and the ground 112. While FIG. 1A illustrates the first source of resistance 104 electrically coupled to the LED driver dimming line 110 and the second source of resistance 106 electrically coupled to the ground 112, in other implementations the first source of resistance 104 can be electrically coupled to the ground 112 while the second source of resistance 106 is electrically coupled to the LED driver dimming line 110.

In the implementation illustrated in FIG. 1A, the first source of resistance 104 comprises a resistor R8, for example having a fixed resistance. One of ordinary skill in the art will appreciate that the first source of resistance 104 can be provided via one, two or more resistors, for example electrically coupled in series with one another. One of ordinary skill in the art will also appreciate that the first source of resistance 104 can be adjustable, allowing a value of resistance provided by first source of resistance 104 to be adjusted or varied, although that may result in more complicated setup in the field. The first source of resistance 104 (e.g., resistor R8) can have a value of resistance that provides for a bias current when the FAO control circuit 100a is set to a maximum dimming setting in which one or more solid-state light sources are driven to produce light (e.g., not in an OFF state), hence is in some instances referred to as a bias resistor. In the illustrated implementation of FIG. 1A, the resistor R8 has a resistance of approximately 75 KOhms.

In the implementation illustrated in FIG. 1A, the second source of resistance comprises a plurality of discrete resistors R1, R2, R3, R4, R5, R6, R7, and R9 (e.g., eight discrete resistors), each discrete resistors R1, R2, R3, R4, R5, R6, R7, R9 having a respective value of resistance. The FAO control circuit 100a includes at least one switch S1 operable to selectively electrically couple the discrete resistors R1, R2, R3, R4, R5, R6, R7, R9 into the voltage divider one at a time. The respective values of resistance for each of these discrete resistors R1, R2, R3, R4, R5, R6, R7, R9 can differ from one another. For example, each successive one of the discrete resistors coupled into the voltage divider can have a respective value of resistance that is successively larger or higher than a respective value of resistance of an immediately previous one of the discrete resistors. As illustrated in the implementation of FIG. 1A, suitable resistance values can, for example include: 100 Ohms, 14.4 KOhms, 16.5 KOhms, 19.6 KOhms, 24.9 KOhms, 34.4 KOhms, 54.9 KOhms, and 130 KOhms, for resistors R9, R1, R2, R3, R4, R5, R6, R7, respectively. The illustrated values of resistance are exemplary, and any nominal values are approximate (i.e., actual values can vary by plus or minus 10% of the nominal values). It is noted that in some implementations the position at which the resistor R9 is located can have any low value of resistance, even zero (0) Ohms, however using some small instead of zero can limit current spikes into the reference node 108a of the shunt regulator U1.

The FAO control circuit 100a can include a Zener diode D1 coupled between the LED driver dimming line 110 and the ground 112. The FAO control circuit 100a can include also include a capacitor C1 electrically coupled in parallel with the shunt voltage regulator U1, across the first and second nodes 108b, 108c thereof.

Figure 2:
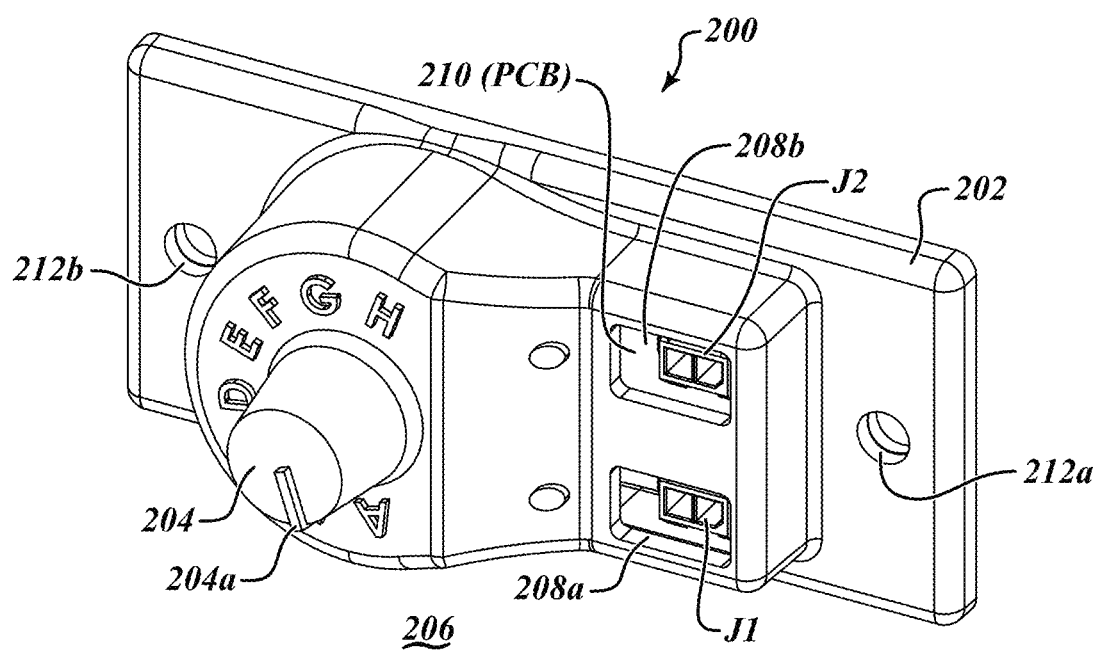
FIG. 2 is a front, bottom, right side isometric view of a field adjustable output control usable with a luminaire to adjust dimming of solid state light sources thereof, the field adjustable output control can include a field adjustable output control circuit, for example the field adjustable output control circuits of FIG. 1A or 1B, according to at least one illustrated implementation.

As noted above, the FAO control circuit 100a includes at least one selector switch S1 which is operable to select a desired or specified dimming level. The at least one selector switch S1 can take a large variety of forms, for example, the form of a multi-position selector switch (e.g., rotary switch or slide switch with multiple orientations, positions or configurations, for instance as illustrated in FIG. 2 and described herein) with a set total number of orientations, positions, or configurations and corresponding states.

As an example, if the at least one selector switch S1 is set to a first state or position 1, the resistor R9 is coupled into one side of the voltage divider 102a with the resistor R8 coupled into the other side of the voltage divider 102a. Also as an example, if the at least one selector switch S1 is set to a second state or position 2, the resistor R1 is coupled into one side of the voltage divider 102a with the resistor R8 coupled into the other side of the voltage divider 102a. Also as an example, if the at least one selector switch S1 is set to a third state or position 3, the resistor R2 is coupled into one side of the voltage divider 102a with the resistor R8 coupled into the other side of the voltage divider 102a. Also as an example, if the at least one selector switch S1 is set to a fourth state or position 4, the resistor R3 is coupled into one side of the voltage divider 102a with the resistor R8 coupled into the other side of the voltage divider 102a. Also as an example, if the at least one selector switch S1 is set to a fifth state or position 5, the resistor R4 is coupled into one side of the voltage divider 102a with the resistor R8 coupled into the other side of the voltage divider 102a. Also as an example, if the at least one selector switch S1 is set to a sixth state or position 6, the resistor R5 is coupled into one side of the voltage divider 102a with the resistor R8 coupled into the other side of the voltage divider 102a. Also as an example, if the at least one selector switch S1 is set to a seventh state or position 7, the resistor R6 is coupled into one side of the voltage divider 102a with the resistor R8 coupled into the other side of the voltage divider 102a. Also as an example, if the at least one selector switch S1 is set to an eighth state or position 2, the resistor R7 is coupled into one side of the voltage divider 102a with the resistor R8 coupled into the other side of the voltage divider 102a.

Thus, the current flowing from the LED driver dimming line 110 is regulated via the shunt voltage regulator U1 based on the input to the reference node 108a from the resistances of the voltage divider 102a. Such provides dimming with low power consumption.

A variety of shunt regulators can be employed as the shunt voltage regulator U1, for example an AZ431LBNTR-GA adjustable shunt regulator, preferably a low current model or version, is used in the illustrated implementation.

The FAO control circuit 100a can include a first connector J1 to physically and electrically connect to the LED driver dimming line 110, the ground 112 and optionally to physically and electrically connect to an auxiliary 12 volt line (not shown). The FAO control circuit 100a can optionally include a second connector J2 to physically and electrically connect to the LED driver dimming line 110, the ground 112 and optionally to physically and electrically connect to an auxiliary 12 volt line (not shown). In at least some implementations (e.g., the illustrated example), a 12 volt line is not used but can be present so that other devices or accessories can be connected to the first connector J1 or the second connector J2 if desired. The use of two connectors J1, J2 in this implementation advantageously allows other devices or components (i.e., auxiliary components) or accessories to be electrically coupled to the FAO control circuit 100a. For example, such can advantageously allow a low power photocontrol or other accessory to be mechanically and/or electrically coupled to the FAO control circuit 100a.

The FAO control circuit 100a can use only the LED driver dimming line 110 and ground 112 without auxiliary power (e.g., via 12 volt line). Such a two-wire configuration is useful for LED drivers 107 which have no auxiliary power supply, and which have only an LED driver dimming line 110 and ground 112 available. Alternatively, various embodiments can take the from of a three-wire configuration.

Figure 1B:
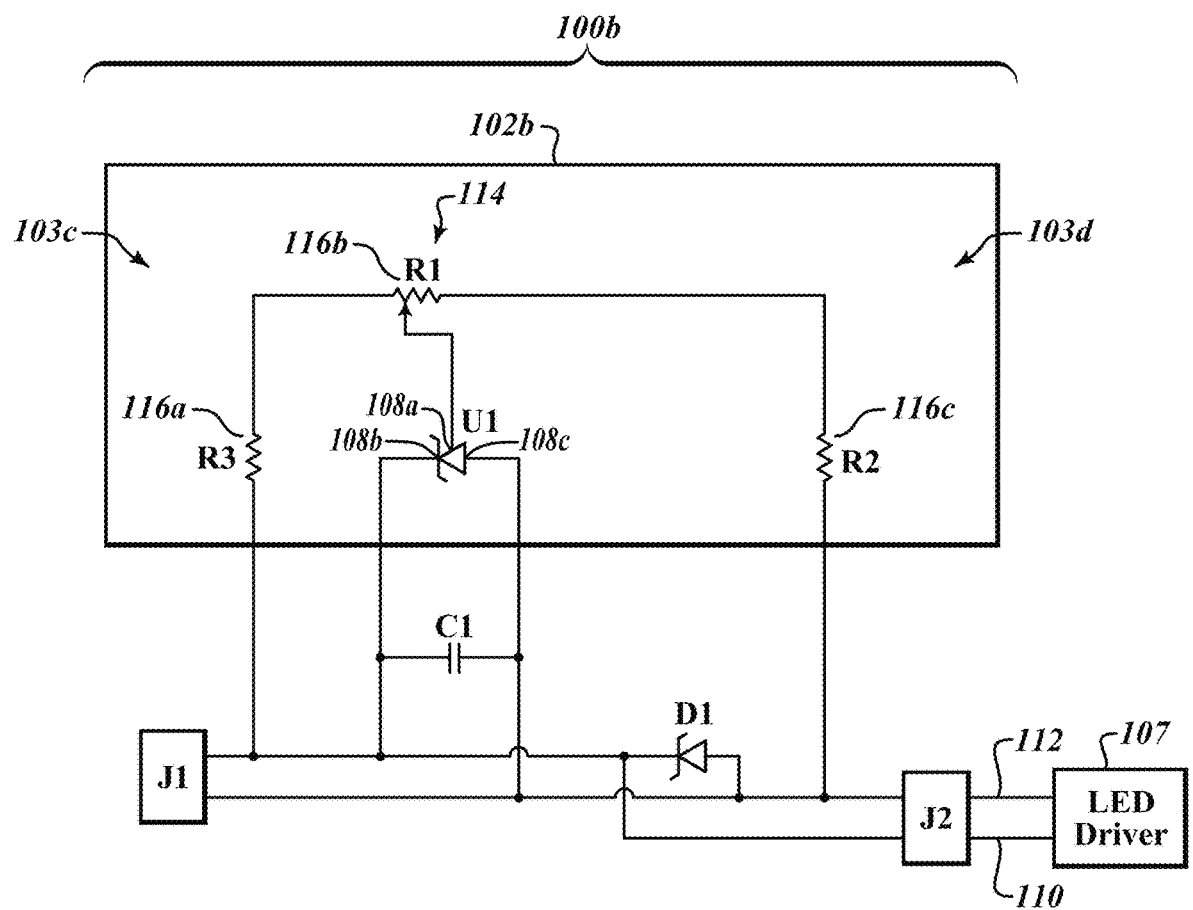
FIG. 1B is a schematic diagram of a field adjustable output control circuit usable with a luminaire to adjust dimming of solid state light sources thereof, according to at least another illustrated implementation.

FIG. 1B shows a field adjustable output (FAO) control circuit 100b usable with a luminaire to adjust dimming, according to at least one illustrated implementation. The FAO control circuit 100b is similar in some respects to the FAO control circuit 100a (FIG. 1A), and thus similar or even identical components are identified with the same reference numbers in FIGS. 1A and 1B and the accompanying discussion.

Similar to the FAO control circuit 100a (FIG. 1A), the FAO control circuit 100b employs a voltage divider 102b, although in contrast to the FAO control circuit 100a (FIG. 1A), the FAO control circuit 100b (FIG. 1B) employs a potentiometer 114 rather than a plurality of discrete resistors R1, R2, R3, R4, R5, R6, R7, R9 (FIG. 1A). In particular, FAO control circuit 100b employs a first source of resistance 116a (third resistor R3) on one side 103c of the voltage divider 102b, a second source of resistance 116b (potentiometer 114, represented as first resistor R1), and a third source of resistance 116c (second resistor R2) on the other side 103d of the voltage divider 102b. Thus, a first source of resistance 116a is provided by the third resistor R3, a second source of resistance 116b is provide by the potentiometer 114 (R1), and a third source of resistance 116c is provided by the second resistor R2. The first source of resistance 116a is interchangeably referred to as a first resistance source, and the second source of resistance 116b is interchangeably referred to as a second resistance source and the third source of resistance 116c is interchangeably referred to as a third resistance source. The first and/or the third sources of resistance 116a, 116c can, for example, each have a fixed value of resistance. In at least some implementations, the values of resistance of the first and the third sources of resistance 116a, 116c can be equal to one another and sufficient to provide a defined minimum bias current for example at a maximum or highest dimming setting.

The shunt regulator U1 can be electrically coupled in parallel with the first and the third sources of resistance 116a, 116c across the LED driver dimming line 110 and the ground 112. While FIG. 1B illustrates the first source of resistance 116a electrically coupled to the LED driver dimming line 110 and the third source of resistance 116c electrically coupled to the ground 112, in other implementations the first source of resistance 116a can be electrically coupled to the ground 112 while the third source of resistance 116c is electrically coupled to the LED driver dimming line 110.

The field adjustable output (FAO) control circuit 100b can include a radio (not shown), which reads the dimming line voltage. The field adjustable output (FAO) control circuit 100b is set such that any voltage over 9V sets the LED driver 107 to 100% and any voltage below around 1V sets the output of the LED driver 107 to 0% (LEDs OFF) but keeps the radio ON (powered).

The FAO control circuit 100b includes at least one selector switch S1 (see FIG. 1A) which is operable to select a desired or specified dimming level by adjusting the value of resistance within a specified range of resistances provided by a variable resistance of the potentiometer 114, with the resistances provided by the first and third sources of resistance 116a, 116c. The at least one selector switch S1 can take a large variety of forms, for example, the form of a multi-position selector switch (e.g., rotary switch or slide switch with multiple orientations, positions or configurations, for instance as illustrated in FIG. 2 and described herein).

The potentiometer 114 allows a continuous varying or adjustment of the value of resistance, rather than having a finite number of increments.

Thus, the current flowing from the LED driver dimming line 110 is regulated via the shunt voltage regulator U1 based on the input to the reference node from the resistances of the voltage divider 102b. Such provides dimming with low power consumption.

A variety of shunt regulators can be employed as the shunt voltage regulator U1, for example an AZ431LBNTR-GA adjustable shunt regulator, preferably a low current model or version, is used in the illustrated implementation.

The FAO control circuit 100b can include a first connector J1 to physically and electrically connect to the LED driver dimming line 110, ground 112 and optionally to physically and electrically connect to an auxiliary 12 volt line (not shown). The FAO control circuit 100b can optionally include a second connector J2 to physically and electrically connect to the LED driver dimming line 110, ground 112 and optionally to physically and electrically connect to the auxiliary 12 volt line (not shown). In at least some implementations (the illustrated example), a 12 volt line is not used but is present so that other devices or accessories can be connected to the first connector J1 or the second connector J2 if desired. The use of two connectors J1, J2 in this implementation advantageously allows other devices or components (i.e., auxiliary components) or accessories to be electrically coupled to the FAO control circuit 100b. For example, such can advantageously allow a low power photocontrol to be coupled to the FAO control circuit 100b.

The FAO control circuit 100b can use only the LED driver dimming line 110 and ground 112 without auxiliary power (e.g., via 12 volt line). Such a two-wire configuration is useful for LED drivers 107 which have no auxiliary power supply, and which have only an LED driver dimming line 110 and ground 112 available.

FIG. 2 shows a field adjustable output (FAO) control 200 usable with a luminaire to adjust dimming, according to at least one illustrated implementation.

The FAO control 200 includes a housing 202. The housing 202 can house an FAO control circuit or portion thereof. For example, the housing 202 can have an interior that houses the FAO control circuit 100a, 100b (FIG. 1A or 1B) or a portion thereof.

As previously explained, the FAO control 200 includes a selector switch S1 (FIG. 1A) that is used to adjust a voltage applied to the LED driver dimming line 110 (FIG. 1A or 1B). The selector switch S1 (FIG. 1A or 1B) can be a manually manipulable selector switch (e.g., rotary switch, slide switch) having a plurality of positions or configurations (e.g., orientations) allowing the selector switch S1 (FIG. 1A or 1B) to selectively be placed in any one of a plurality of states, for example where there is a set total number of states. In the illustrated implementation, the FAO control 200 includes a portion in the form of a selector knob 204 that can be placed (e.g., rotated) into a plurality of positions or configurations, in this example each position or configuration is denominated by a respective one of the letters A through H which appear on a portion of the housing 202. The selector knob 204 can bear an indicator or marking 204a to visually represent alignment with a selected one of the positions or configurations as represented by the letters. One of skill will appreciate that other indications can be employed to represent respective positions or configurations, for example integers, or some implementations can employ no indications relying on the user to access the different positions or configurations by changes in brightness of light emitting by an associated luminaire.

The housing 202 can have one or more ports 208a, 208b (two shown) sized and positioned to provide access to connectors J1, J2. The two connectors J1, J2 can be carried on a printed circuit board 210 (portion visible through ports 208a, 208b), which can also carry the FAO control circuit 100a, 100b (FIG. 1A or 1B).

The housing 202 can also have one or more attachment locations or attachment features 212a, 212b (two shown), for example through-holes to receive fasteners (e.g., bolts, screws, clamps). In use, the housing 202 can be physically coupled to a portion of a luminaire, for example physically coupled in an interior of the luminaire or alternatively to an exterior portion thereof. The FAO control circuit 100a, 100b (FIG. 1A or 1B) can be physically and electrically coupled to an LED driver 107 (FIG. 1A or 1B) via one of the connectors (e.g., connector J1) for instance via jumper wires or a jumper cable 316a (FIG. 3C). Optionally, a peripheral device or component or accessory (e.g., low voltage photocontrol 400, FIG. 4) can be physically and electrically coupled to the FAO control circuit 100a, 100b (FIG. 1A or 1B) for example via one of the connectors (e.g., connector J2) for instance via jumper wires or a jumper cable (not shown) and an interface (interface 312, FIG. 3B).

To select a desired dimming level, the selector knob 204 is rotated align the indicator or marking 204a to the desired position or configuration, thereby coupling none, one, or more of the voltage reference integrated circuits D1-D7 (FIG. 1A or 1B) electrically in series between the LED driver dimming line 110 and ground 112 (FIG. 1A or 1B). A desired or suitable position or configuration can, for example, be determined either by choosing the desired lumens of light output (e.g., using a table provided with the FAO control circuit 100a, 100b) or via visual determination of an appropriate light level emitted by an associated luminaire.

The FAO control 200 can be housed in a luminaire, on a luminaire or even on a pole or other support structure for instance a pole or other support structure that supports a luminaire.

Figure 3A:
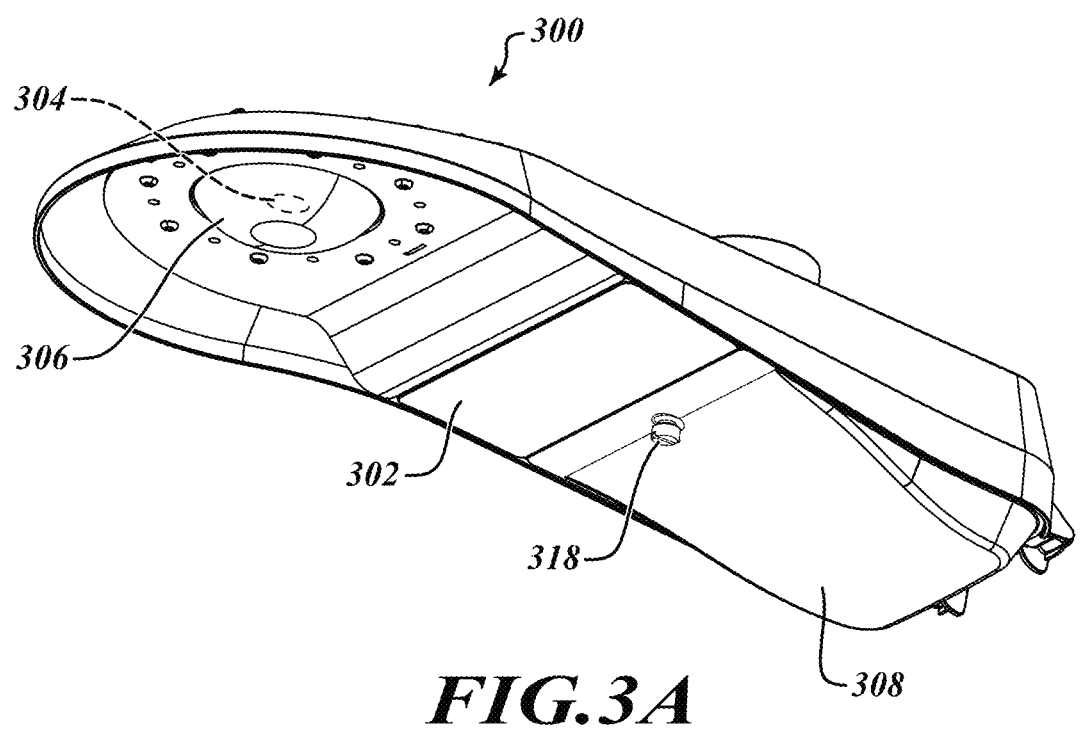
FIG. 3A is a bottom, front, right side isometric view of a luminaire useable with a field adjustable output control, for example usable with the field adjustable output control of FIG. 2, according to at least one illustrated implementation.
Figure 3B:
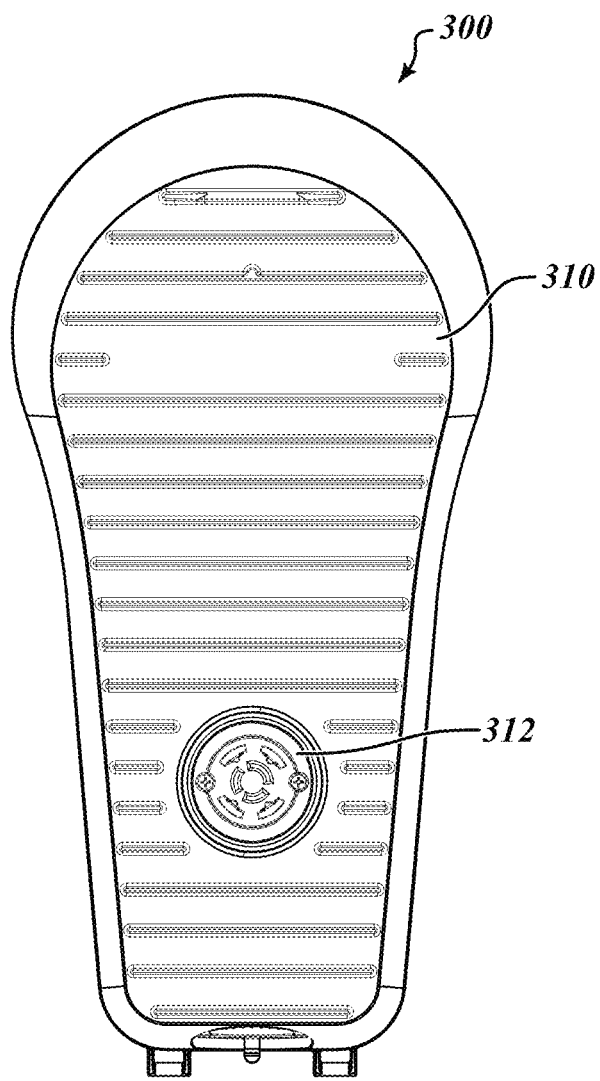
FIG. 3B a top plan view of the luminaire of FIG. 3A, showing an interface to couple a peripheral device or component thereto, for instance to couple a photocontrol thereto, according to at least one illustrated implementation.
Figure 3C:
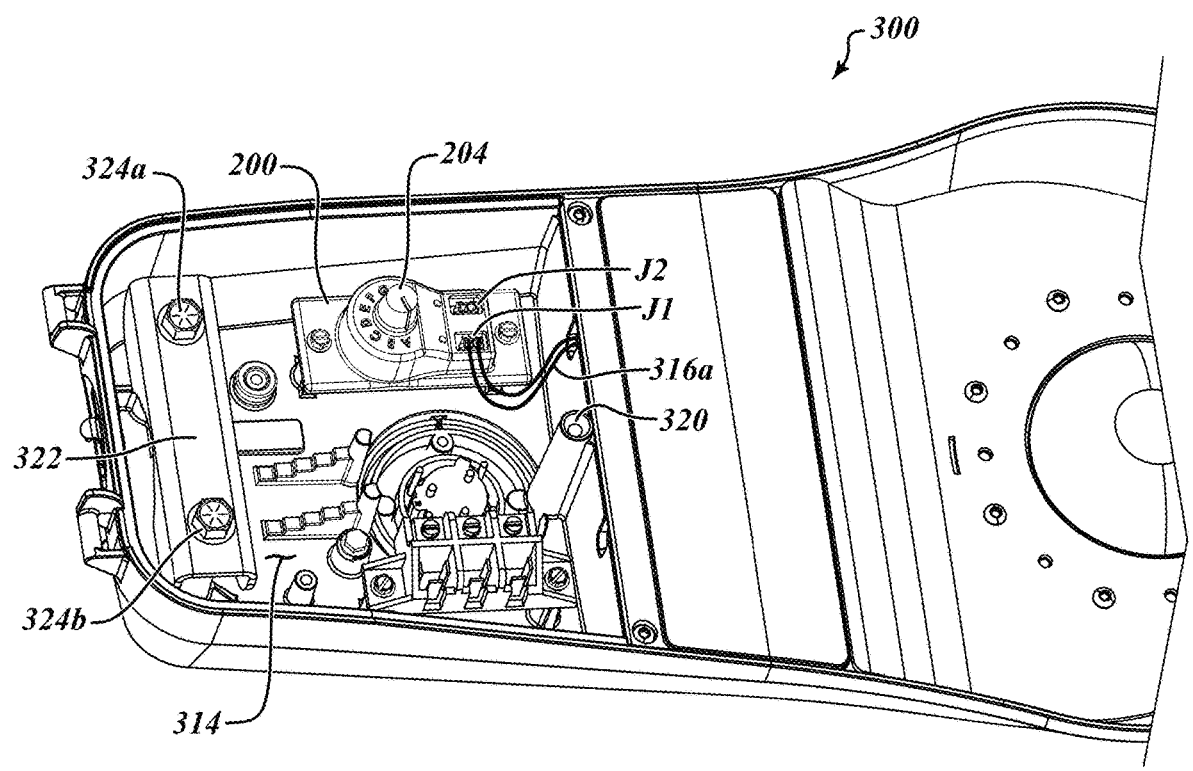
FIG. 3C a bottom plan view of the luminaire of FIGS. 3A and 3B with a cover or panel removed to expose a portion of an interior of the luminaire and showing a field adjustable output control of FIG. 2 coupled therein, according to at least one illustrated implementation.

FIGS. 3A, 3B and 3C show a luminaire 300, according to at least one illustrated implementation. In particular, FIG. 3A shows a bottom side 302 of the luminaire 300 with a set of solid state light sources in the form of LEDs 304 (only one called out) behind one or more lenses 306, and optionally a removable bottom cover or panel 308. FIG. 3B shows a top portion 310 of the luminaire 300 with a physical and electrical coupler or interface 312 via which a periphery device or component or accessory (e.g., a photocontrol) can be physically and electrically coupled. FIG. 3C shows the luminaire 300 with the bottom cover or panel 308 removed, exposing a portion of an interior 314 of the luminaire 300 and illustrating FAO control 200 with selector knob 204 and connectors J1, J2 along with jumper wires or jumper cable 316a.

In some implementations, a portion (e.g., selector knob 204) of the FAO control 200 is manipulable without a tool, for example being sized and shaped to be manually engaged and operated by fingers and/or by a hand of a person. This can advantageously facilitate on-site adjustments of light output of an associated luminaire without the need for tools. In some implementations, the portion (e.g., selector knob 204) of the FAO control 200 may not be accessible from the exterior 206 of the housing 202 without removal of a cover or panel (e.g., cover or panel 308). Removal of the cover or panel may not require a tool or special tool, for example where secured by detents and provided with a pull or knob, or secured by one or more fasteners 318 (one shown in FIG. 3A, e.g., nuts, wing nuts, bolts, or clamps) where such fastener(s) 318 are sized and shaped to be manually engaged and operated by fingers and/or by a hand of a person as best illustrated in FIG. 3A where a threaded bolt has a head sized and shaped to be easily grasped and rotated via a thumb and a number of fingers, and a shaft of the threaded bolt is engagingly receivable via a threaded hole 320 (FIG. 3C). Such an approach can be provide adequate security as the luminaires 300 are typically mounted (e.g. pole mounted) sufficiently high enough off the ground as to require a bucket truck to access, hence reducing the likelihood of tampering. Alternatively, removal of the cover or panel 308 may require a special tool (e.g., screw driver or wrench with a non-typical profile) to enhance security. Additionally or alternatively, manipulation of the portion (e.g., selector knob 204) of the FAO control 200 might be via a tool or special tool, again enhancing security. Alternatively, in some implementations, a portion (e.g., selector knob 204) of the FAO control 200 is accessible from an exterior 206 of the housing 202 without removal of a cover or panel 308 of the luminaire 300.

As illustrated, the luminaire 300 can include a bracket or clamp 322 with one or more fasteners 324a, 324b (two shown, e.g., nuts, wing nuts, bolts, or clamps) to secure the luminaire 300 to a pole or arm extending from a pole or other support structure.

Figure 4:
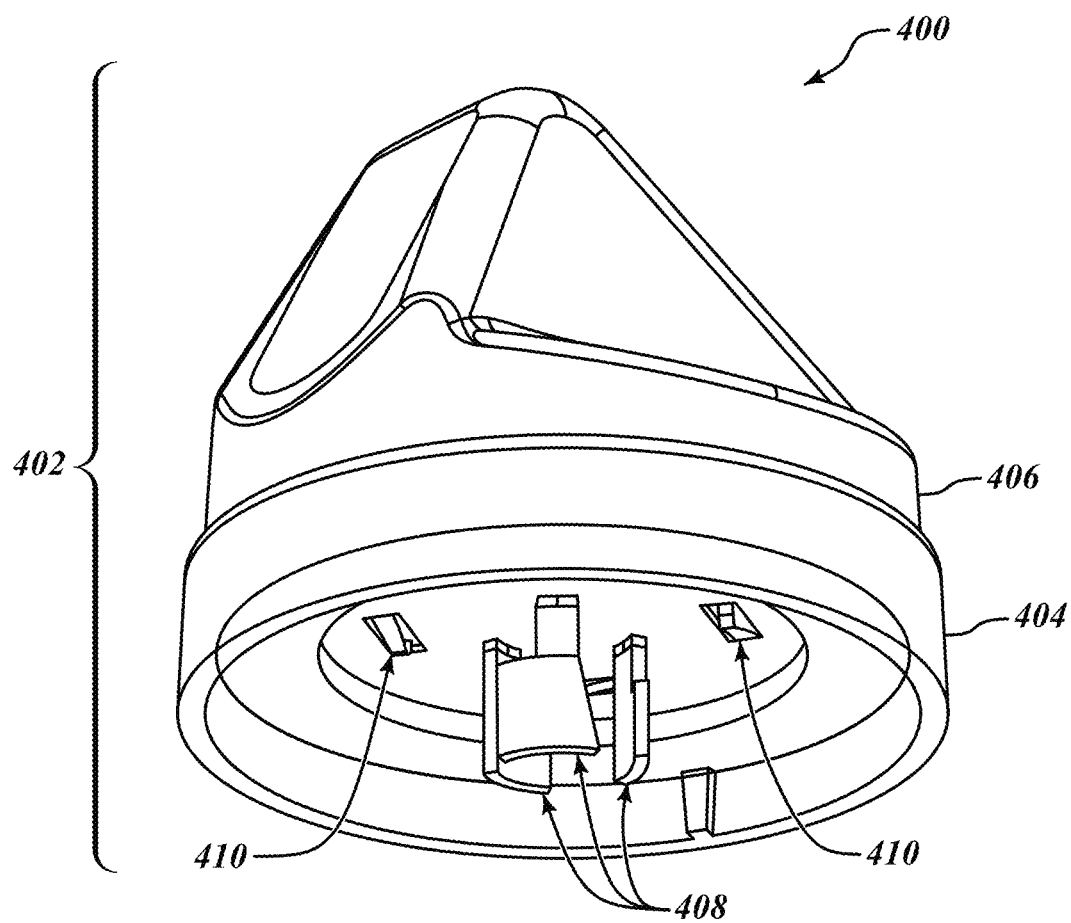
FIG. 4 is a bottom, front left side isometric view of a photocontrol, which can be coupled to the interface of the luminaire of FIGS. 3A-3C, according to at least one illustrated implementation.

FIG. 4 shows a photocontrol 400, according to at least one illustrated implementation, the photocontrol physically and electrically coupleable to the luminaire, for instance via the coupler or interface 312 (FIG. 3B).

As illustrated, the photocontrol 400 including a housing 402 comprising a base 404 and a cover 406. The housing 402 houses a set of photocontroller circuitry (not shown). The base 404 of the photocontrol 400 include a set of power contacts 408 and optionally signal contacts 410, accessible from a bottom of the base 404 of housing 402, which can communicatively couple with interface 312 (FIG. 3B), which in turn can be communicatively coupled to the FAO control circuit 100a, 100b via the second connector J2 (FIGS. 1A, 1B, 3C) for example via jumper wires or jumper cables.

The housing 402 may be a clear plastic and may provide environmental protection for the set of photocontroller circuitry and printed circuit board (PCB), as well as protect users from exposure to the set of photocontroller circuitry and possible electrical shock. The housing 402 may include one or more light directing features (not called out in FIG. 4), for example molded into the housing 402. The light directing feature(s) may be included so that the photocontrol is more sensitive in one direction than another.

A rotatable interface (e.g., socket) may be installed in the luminaire 300 (FIGS. 3A-3C) so that the photocontrol 400 may be rotated to a preferred direction, such as the North direction. A secondary light direction element or coating may be inserted or applied to the cover to block or channel ambient light to a photosensor, to increase the directional response of the photocontrol 400. The housing 402 is sealed to the contact mounting base to protect the photocontrol circuitry from water or foreign matter ingress. The housing 402 may be infused with UV protecting chemicals such as the Omnifusion™ process.

The photocontrol 400 can take any of a variety of forms, for example the photocontrol illustrated and described in commonly assigned: U.S. Pat. Nos. 9,445,485; 9,462,662; 9,466,443; 10,531,537; 11,234,304; or U.S. patent application Ser. No. 17/702,654, published as U.S. Patent Application Publication No. 2022-0217827A1.

The various implementations and embodiments described above can be combined to provide further implementations and embodiments. All of the commonly assigned US patent application publications, US patent applications, foreign patents, and foreign patent applications referred to in this specification and/or listed in the Application Data Sheet, including but not limited to: U.S. Provisional Patent Application No. 61/052,924, filed May 13, 2008; U.S. Pat. No. 8,926,138, issued Jan. 6, 2015; PCT Publication No. WO2009/140141, published Nov. 19, 2009; U.S. Provisional Patent Application No. 61/051,619, filed May 8, 2008; U.S. Pat. No. 8,118,456, issued Feb. 21, 2012; PCT Publication No. WO2009/137696, published Nov. 12, 2009; U.S. Provisional Patent Application No. 61/088,651, filed Aug. 13, 2008; U.S. Pat. No. 8,334,640, issued Dec. 18, 2012; U.S. Provisional Patent Application No. 61/115,438, filed Nov. 17, 2008; U.S. Provisional Patent Application No. 61/154,619, filed Feb. 23, 2009; U.S. Patent Publication No. 2010/0123403, published May 20, 2010; U.S. Patent Publication No. 2016/0021713, published Jan. 21, 2016; PCT Publication No. WO2010/057115, published May 20, 2010; U.S. Provisional Patent Application No. 61/174,913, filed May 1, 2009; U.S. Pat. No. 8,926,139, issued Jan. 6, 2015;

PCT Publication No. WO2010/127138, published Nov. 4, 2010; U.S. Provisional Patent Application No. 61/180,017, filed May 20, 2009; U.S. Pat. No. 8,872,964, issued Oct. 28, 2014; U.S. Patent Publication No. 2015/0015716, published Jan. 15, 2015; PCT Publication No. WO2010/135575, published Nov. 25, 2010; U.S. Provisional Patent Application No. 61/229,435, filed Jul. 29, 2009; U.S. Patent Publication No. 2011/0026264, published Feb. 3, 2011; U.S. Provisional Patent Application No. 61/295,519, filed Jan. 15, 2010; U.S. Provisional Patent Application No. 61/406,490, filed Oct. 25, 2010; U.S. Pat. No. 8,378,563, issued Feb. 19, 2013; PCT Publication No. WO2011/088363, published Jul. 21, 2011; U.S. Provisional Patent Application No. 61/333,983, filed May 12, 2010; U.S. Pat. No. 8,541,950, issued Sep. 24, 2013; PCT Publication No. WO2010/135577, published Nov. 25, 2010; U.S. Provisional Patent Application No. 61/346,263, filed May 19, 2010; U.S. Pat. No. 8,508,137, issued Aug. 13, 2013; U.S. Pat. No. 8,810,138, issued Aug. 19, 2014; U.S. Pat. No. 8,987,992, issued Mar. 24, 2015; PCT Publication No. WO2010/135582, published Nov. 25, 2010; U.S. Provisional Patent Application No. 61/357,421, filed Jun. 22, 2010; U.S. Pat. No. 9,241,401, granted Jan. 19, 2016; PCT Publication No. WO2011/163334, published Dec. 29, 2011; U.S. Pat. No. 8,901,825, issued Dec. 2, 2014; U.S. Patent Publication No. 2015/0084520, published Mar. 26, 2015; PCT Publication No. WO2012/142115, published Oct. 18, 2012; U.S. Pat. No. 8,610,358, issued Dec. 17, 2013; U.S. Provisional Patent Application No. 61/527,029, filed Aug. 24, 2011; U.S. Pat. No. 8,629,621, issued Jan. 14, 2014; PCT Publication No. WO2013/028834, published Feb. 28, 2013; U.S. Provisional Patent Application No. 61/534,722, filed Sep. 14, 2011; U.S. Pat. No. 9,312,451, issued Apr. 12, 2016; PCT Publication No. WO2013/040333, published Mar. 21, 2013; U.S. Provisional Patent Application No. 61/567,308, filed Dec. 6, 2011; U.S. Pat. No. 9,360,198, issued Jun. 7, 2016; U.S. Provisional Patent Application No. 61/561,616, filed Nov. 18, 2011; U.S. Patent Publication No. 2013/0141010, published Jun. 6, 2013; PCT Publication No. WO2013/074900, published May 23, 2013; U.S. Provisional Patent Application No. 61/641,781, filed May 2, 2012; U.S. Patent Publication No. 2013/0293112, published Nov. 7, 2013; U.S. Patent Publication No. 2013/0229518, published Sep. 5, 2013; U.S. Provisional Patent Application No. 61/640,963, filed May 1, 2012; U.S. Patent Publication No. 2013/0313982, published Nov. 28, 2013; U.S. Patent Publication No. 2014/0028198, published Jan. 30, 2014; U.S. Pat. No. 9,801,248, issued Oct. 24, 2017; PCT Publication No. WO2014/018773, published Jan. 30, 2014; U.S. Provisional Patent Application No. 61/723,675, filed Nov. 7, 2012; U.S. Pat. No. 9,301,365, issued Mar. 29, 2016; U.S. Provisional Patent Application No. 61/692,619, filed Aug. 23, 2012; U.S. Patent Publication No. 2014/0055990, published Feb. 27, 2014; U.S. Provisional Patent Application No. 61/694,159, filed Aug. 28, 2012; U.S. Pat. No. 8,878,440, issued Nov. 4, 2014; U.S. Patent Publication No. 2014/0062341, published Mar. 6, 2014; U.S. Patent Publication No. 2015/0077019, published Mar. 19, 2015; PCT Publication No. WO2014/039683, published Mar. 13, 2014; U.S. Provisional Patent Application No. 61/728,150, filed Nov. 19, 2012; U.S. Patent Publication No. 2014/0139116, published May 22, 2014; U.S. Pat. No. 9,433,062, issued Aug. 30, 2016; PCT Publication No. WO2014/078854, published May 22, 2014; U.S. Provisional Patent Application No. 61/764,395, filed Feb. 13, 2013; U.S. Pat. No. 9,288,873, issued Mar. 15, 2016; U.S. Provisional Patent Application No. 61/849,841, filed Jul. 24, 2013; U.S. Patent Publication No. 2015/0028693, published Jan. 29, 2015; PCT Publication No. WO2015/013437, published Jan. 29, 2015; U.S. Provisional Patent Application No. 61/878,425, filed Sep. 16, 2013; U.S. Patent Publication No. 2015/0078005, published Mar. 19, 2015; PCT Publication No. WO2015/039120, published Mar. 19, 2015; U.S. Provisional Patent Application No. 61/933,733, filed Jan. 30, 2014; U.S. Pat. No. 9,185,777, issued Nov. 10, 2015; PCT Publication No. WO2015/116812, published Aug. 6, 2015; U.S. Provisional Patent Application No. 61/905,699, filed Nov. 18, 2013; U.S. Pat. No. 9,414,449, issued Aug. 9, 2016; U.S. Pat. Nos. 9,462,662; 9,466,443; 9,781,797, issued Oct. 3, 2017; U.S. Provisional Patent Application No. 62/068,517, filed Oct. 24, 2014; U.S. Provisional Patent Application No. 62/183,505, filed Jun. 23, 2015; U.S. Pat. No. 9,445,485, issued Sep. 13, 2016; PCT Publication No. WO2016/064542, published Apr. 28, 2016; U.S. Provisional Patent Application No. 62/082,463, filed Nov. 20, 2014; U.S. Publication No. 2016/0150369, published May 26, 2016; PCT Publication No. WO2016/081071, published May 26, 2016; U.S. Provisional Patent Application No. 62/057,419, filed Sep. 30, 2014; U.S. Publication No. 2016/0095186, published Mar. 31, 2016; PCT Publication No. WO2016/054085, published Apr. 7, 2016; U.S. Provisional Patent Application No. 62/114,826, filed Feb. 11, 2015; U.S. Non-provisional patent application Ser. No. 14/939,856, filed Nov. 12, 2015; U.S. Provisional Patent Application No. 62/137,666, filed Mar. 24, 2015; U.S. Non-provisional patent application Ser. No. 14/994,569, filed Jan. 13, 2016; U.S. Non-provisional patent application Ser. No. 14/844,944, filed Sep. 3, 2015; U.S. Provisional Patent Application No. 62/208,403, filed Aug. 21, 2015; U.S. Non-provisional patent application Ser. No. 15/238,129, filed Aug. 16, 2016; U.S. Provisional Patent Application No. 62/264,694, filed Dec. 8, 2015; U.S. Non-provisional patent application Ser. No. 15/369,559, filed Dec. 5, 2016; U.S. Provisional Patent Application No. 62/397,709, filed Sep. 21, 2016; U.S. Non-provisional patent application Ser. No. 15/709,022, filed Sep. 19, 2017; U.S. Provisional Patent Application No. 62/397,713, filed Sep. 21, 2016; U.S. Non-provisional patent application Ser. No. 15/709,028, filed Sep. 19, 2017; U.S. Provisional Patent Application No. 62/327,939, filed Apr. 26, 2016; U.S. Non-provisional patent application Ser. No. 15/496,985, filed Apr. 25, 2017; U.S. Provisional Patent Application No. 62/379,037, filed Aug. 24, 2016; U.S. Non-provisional patent application Ser. No. 15/681,927, filed Aug. 21, 2017; U.S. Provisional Patent Application No. 62/458,970, filed Feb. 14, 2017; U.S. Non-provisional patent application Ser. No. 15/895,439, filed Feb. 13, 2018; U.S. Provisional Patent Application No. 62/480,833, filed Apr. 3, 2017; U.S. Non-provisional patent application Ser. No. 15/943,183, Apr. 2, 2018; U.S. Provisional Patent Application No. 62/507,730, filed May 17, 2017; U.S. Non-provisional patent application Ser. No. 15/980,978, filed May 16, 2018; U.S. Non-provisional patent application Ser. No. 15/799,744, filed Oct. 31, 2017; U.S. Provisional Patent Application No. 62/669,883, filed May 10, 2018; U.S. Provisional Patent Application No. 62/701,392, filed Jul. 20, 2018; U.S. patent application Ser. No. 16/517,137, filed Jul. 19, 2019 (now published as US2020/0029404); U.S. Provisional Application No. 62/930,283, filed Nov. 4, 2019; U.S. Pat. No. 10,531,537; U.S. patent application Ser. No. 16/842,924, filed Apr. 8, 2020 and now granted as U.S. Pat. No. 11,234,304; U.S. patent application 62/864,121, filed Jun. 20, 2019; U.S. patent application 63/010,412, filed Apr. 15, 2020; U.S. Non-provisional application Ser. No. 16/906,800, filed Jun. 19, 2020; U.S. Non-provisional application Ser. No. 17/088,395, filed Nov. 3, 2020 and granted as U.S.

Pat. No. 11,212,887; U.S. patent application Ser. No. 17/702,654, published as U.S. Patent Application Publication No. 2022-0217827A1; U.S. Patent Application No. 63/429,675, filed Dec. 2, 2022; U.S. patent application Ser. No. 18/370,304, filed Sep. 19, 2023; and U.S. Patent Application No. 63/431,466, filed Dec. 9, 2022, are each incorporated herein by reference, in their entirety. These and other changes can be made to the embodiments in light of the above-detailed description.

The various embodiments described above can be combined and/or modified to provide further embodiments in light of the above-detailed description, including the material incorporated by reference. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An apparatus, comprising:
a first resistance source;
a second resistance source electrically coupled in series with the first resistance source, the second resistance source selectively operable to vary a value of resistance provided by the second resistance source;
at least one switch operable to selectively adjust the value of resistance provided by the second resistance source;
a shunt voltage regulator having a reference node, a first node and a second node, the reference node coupled between the first resistance source and the second resistance source to form a voltage divider that provides a reference voltage to the shunt voltage regulator, wherein the shunt voltage regulator is electrically coupled between an LED driver dimming line and a ground via the first and the second nodes of the shunt voltage regulator to regulate a flow of current from the LED driver dimming line based on the reference voltage supplied via the voltage divider.

2. The apparatus of claim 1 wherein second resistance source comprises:
a plurality of discrete resistors, each of the discrete resistors of the plurality of discrete resistors having a respective associated voltage drop thereacross; and
wherein the at least one switch is operable to selectively electrically couple the discrete resistors into the voltage divider one at a time.

3. The apparatus of claim 2 wherein the at least one switch has a total number of states equal to an integer value of n and a total number of the plurality of discrete resistors is equal to the integer value of n.

4. The apparatus of claim 3 wherein for each of the discrete resistors of the plurality of discrete resistors, the respective voltage drop thereacross is different from the respective associated voltage drop across each of other ones of the discrete resistors of the plurality of discrete resistors.

5. The apparatus of claim 4 wherein for each successive state of the total number of states of the at least one switch, the at least one switch electrically couples a respective one of the discrete resistors into the voltage divider, where each successive one of the discrete resistors coupled into the voltage divider has a respective value of resistance that is successively higher than a respective value of resistance of an immediately previous one of the discrete resistors.

6. The apparatus of claim 4 wherein the at least one switch has eight states and the plurality of discrete resistors includes eight discrete resistors.

7. The apparatus of claim 6 wherein the plurality of resistors have respective values of resistance of: approximately 100 Ohms, approximately 14.4 KOhms, approximately 16.5 KOhms, approximately 19.6 KOhms, approximately 24.9 KOhms, approximately 34.4 KOhms, approximately 54.9 KOhms and approximately 130 KOhms within plus or minus 10% of a nominal one of the values of resistance.

8. The apparatus of claim 1 wherein the second resistance source comprises a potentiometer having a variable resistance in a specified range of resistances, and the at least one switch is operable to adjust the potentiometer.

9. The apparatus of claim 8, further comprising:
a third resistance source, where the first resistance source is on a first side of the voltage divider and the third resistance source is on a second side of the voltage divider, the first and the second resistance sources having respective values of resistance sufficient to provide a bias current when the at least one switch is set to a maximum dimming setting in which one or more solid-state light sources are driven to produce light.

10. The apparatus of claim 8 wherein the potentiometer is operable to provide a continuously variable resistance in the specified range of resistances.

11. The apparatus of claim 1 wherein the at least one switch is a mechanical selector switch.

12. The apparatus of claim 1 wherein the at least one switch is a rotary mechanical selector switch.

13. The apparatus of claim 1, further comprising:
a housing having an interior and an exterior, the first resistance source, the second resistance source and the shunt voltage regulator housed in the interior of the housing, and wherein the at least one switch is physically engageable from an exterior of the housing either with or without a tool.

14. The apparatus of claim 1, further comprising:
a housing having an interior and an exterior, the first resistance source, the second resistance source and the shunt voltage regulator are all housed in the interior of the housing, and wherein the at least one switch includes a knob that extends into the exterior from the housing and is physically engageable from the exterior of the housing without a tool.

15. The apparatus of claim 1 wherein the at least one switch is operable to set a desired dimming level of a luminaire.

16. The apparatus of claim 1, further comprising:
a first connector to mechanically and electrically couple to an LED driver.

17. The apparatus of claim 16 wherein the first connector takes the form of a two-wire configuration that electrically couples only a dimming line and a ground line to the LED driver and does not have any auxiliary power supply line.

18. The apparatus of claim 17 wherein the first connector takes the form of a three-wire configuration that electrically couples a dimming line, a ground line, and auxiliary power supply line from the LED driver.

19. The apparatus of claim 17, further comprising:
a second connector to mechanically and electrically couple to an accessory.

20. The apparatus of claim 19 wherein the accessory is a low power photocontrol.

21. The apparatus of claim 1, further comprising:
a plurality of light emitting diodes and wherein the apparatus takes the form of a luminaire.

22. The apparatus of claim 1 wherein the apparatus is physically and electrically coupleable to a luminaire that comprises a plurality of light emitting diodes and the apparatus is operable to adjust an output of the plurality of light emitting diodes of the luminaire.

\* \* \* \* \*